United States Patent
Suh et al.

(10) Patent No.: US 10,411,941 B2
(45) Date of Patent: Sep. 10, 2019

(54) SEMI-ORTHOGONAL MULTIPLE ACCESS WITH POWER-ADAPTIVE CONSTELLATION

(71) Applicants: Jung Hoon Suh, Ottawa (CA); Jia Jia, Shenzhen (CN); Osama Aboul-Magd, Ottawa (CA); Kwok Shum Au, Ottawa (CA)

(72) Inventors: Jung Hoon Suh, Ottawa (CA); Jia Jia, Shenzhen (CN); Osama Aboul-Magd, Ottawa (CA); Kwok Shum Au, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/835,218

(22) Filed: Dec. 7, 2017

(65) Prior Publication Data

US 2019/0182095 A1  Jun. 13, 2019

(51) Int. Cl.

| H04L 5/12 | (2006.01) |
|---|---|
| H04L 27/34 | (2006.01) |
| H04L 27/18 | (2006.01) |
| H04L 1/00 | (2006.01) |
| H04L 27/04 | (2006.01) |
| H04L 27/00 | (2006.01) |

(52) U.S. Cl.
CPC ........ *H04L 27/3411* (2013.01); *H04L 1/0004* (2013.01); *H04L 1/0005* (2013.01); *H04L 27/04* (2013.01); *H04L 27/183* (2013.01); *H04L 27/3488* (2013.01); *H04L 27/0008* (2013.01)

(58) Field of Classification Search
CPC ......... H04L 27/38; H04L 27/34; H04L 25/20; H04L 1/0026; H04L 2001/0093; H04W 72/044; H04W 72/042; H04W 72/0473; H04B 7/0626; H04B 7/0617
USPC .......................... 375/261, 260, 269; 370/312
See application file for complete search history.

(56) References Cited

U.S. PATENT DOCUMENTS

| 2011/0135020 | A1 | 6/2011 | Au-Yeung et al. |
|---|---|---|---|
| 2011/0255623 | A1* | 10/2011 | Golitschek Edler Von Elbwart .................. H04L 27/34 375/261 |
| 2013/0287150 | A1 | 10/2013 | Jung et al. |
| 2014/0328425 | A1 | 11/2014 | Li et al. |
| 2016/0366003 | A1 | 12/2016 | Kwon et al. |
| 2017/0180097 | A1* | 6/2017 | Zhu ...................... H04L 27/3405 |
| 2018/0175968 | A1* | 6/2018 | Shin ....................... H04L 27/34 |

FOREIGN PATENT DOCUMENTS

| CN | 102696258 A | 9/2012 |
|---|---|---|
| CN | 104272641 A | 1/2015 |

* cited by examiner

*Primary Examiner* — Khai Tran

(57) ABSTRACT

Example embodiments provide a system and method for controlling power allocated to each of the constituent constellations that make up a superposed symbol constellation. In some examples, superposed constellations with adaptive power allocation are used in wireless local area networks (WLAN).

22 Claims, 18 Drawing Sheets

SEMI-ORTHOGONAL MULTIPLE ACCESS WITH POWER-ADAPTIVE CONSTELLATION

FIELD

The present disclosure relates generally to digital communications, and more particularly to a system and method for using superposed symbol constellations in wireless local area networks (WLAN).

BACKGROUND

A common goal of successive generations of radio frequency communications systems is to increase the amount of information transmitted in a given communications band. As an example, US patent application publication No. 2016/0204969 discloses a Semi-Orthogonal Multiple Access (SOMA) system that allows multiple electronic devices to use superposed constellations to share wireless spectrum. In SOMA, superposed symbol constellations are formed from constituent constellations that use different modulation layers. The resulting symbols include higher modulation layer and lower modulation layer sub-symbols that have different decoding reliabilities. Higher modulation layer sub-symbols have lower reliability and can be more suitable for high signal-to-noise ratio (SNR) channels. Lower modulation layer sub-symbols have higher reliability and can be more suitable for lower SNR channels. The phrase "semi-orthogonal" in SOMA derives from the property that, from the perspective of a high SNR receiver decoding the lower reliabilty sub-symbols, the higher reliabilty sub-symbols can be considered as non-interfering and thus orthogonal to the lower reliability sub-symbols. However, from the perspective of a low SNR receiver decoding the higher reliabilty sub-symbols, the lower reliability sub-symbols can be considered as interference that is non-orthogonal to the higher reliabilty sub-symbols. SOMA may, for example, be applied in advanced radio access technologies. To date, proposed SOMA systems have relied on a QAM constellation that is the same as that specified for IEEE 802.11ac compliant radio access technologies.

Systems that can further improve on wireless spectrum usage using superposed constellations are desirable.

SUMMARY

Example embodiments provide a system and method for controlling power allocated to each of the constituent constellations that make up a superposed symbol constellation. In some examples, superposed constellations with adaptive power allocation are used in wireless local area networks (WLAN).

A first aspect of the disclosure provides a method performed at a network node. The method includes determining a power allocation factor from a plurality of possible power allocation factors, allocating, based on the power allocation factor, energy between first and second constituent constellations that are superposed to form a quadrature amplitude modulation (QAM) constellation, and mapping first data and second data to a symbol of the QAM constellation, wherein the first data is mapped to a first sub-symbol of the symbol that corresponds to the first constituent constellation and the second data is mapped to a second sub-symbol of the symbol that corresponds to the second constituent constellation. The constellation symbol is transmitted in a frame as an radio frequency (RF) signal.

In some examples of the first aspect, increasing the power allocation factor increases energy allocated to the first constituent constellation by an amount that is proportional to a decrease in energy allocated to the second constituent constellation. In some example's the QAM constellation includes a sub-constellation of symbols in each of four quadrants, wherein increasing the power allocation factor increases distances between symbols within each sub-constellation and decreases distances between the sub-constellations. In some examples, the power allocation factor represents an average power of each symbol in the QAM constellation.

In example embodiments, the plurality of power allocation factors includes at least one power allocation factor that corresponds to an 801.11ac QAM constellation.

According to a second aspect is an access point (AP) that includes a memory, an interface for wireless communication, and a processing device configured to execute instructions stored in the memory. The executed instructions cause the AP to determine a power allocation factor from a plurality of possible power allocation factors, allocate, based on the power allocation factor, energy between first and second constituent constellations that are superposed to form a quadrature amplitude modulation (QAM) constellation, and map first data and second data to a symbol of the QAM constellation, wherein the first data is mapped to a first sub-symbol of the symbol that corresponds to the first constituent constellation and the second data is mapped to a second sub-symbol of the symbol that corresponds to the second constituent constellation. The constellation symbol is transmitted in a frame as an radio frequency (RF) signal using the interface.

According to a third aspect is a method and station (STA) for receiving an RF signal that includes a frame comprising a QAM constellation symbol having first data mapped to a first sub-symbol and second data mapped to a second sub-symbol of the symbol, the first sub symbol corresponding to a first constituent constellation and the second sub-symbol corresponding to a second constituent constellation, the frame including power allocation information identifying a relative allocation of energy between the first sub-symbol and the second sub-symbol. At the STA, a power allocation factor is determined from a plurality of possible power allocation factors based on the power allocation information in the frame. The symbol is decoded to recover at least one of the first and second sub-symbols based on the power allocation factor.

According to a forth aspect is a method that includes generating a stream of quadrature phase shift keying (QPSK) symbols, each symbol having a first bit representing a respective data bit and a second bit representing a respective bit of a reference sequence; and transmitting the QPSK symbols in a frame as an radio frequency (RF) signal. In examples, the QPSK symbols form a mid-amble of the frame that is subsequent to a preamble of the frame. In some cases, the mid-amble is preceded by and followed by QAM symbols that have a higher modulation than QPSK. In some examples the reference sequence is a channel estimation sequence. The method may for be performed by a suitably configured access point.

According to a fifth aspect is a method at a receiver that includes: receiving, through a wireless communication channel, a frame that includes a plurality of quadrature phase shift keying (QPSK) symbols, each symbol having a first bit representing a respective data bit and a second bit representing a respective bit of a reference sequence. The frame is decoded to recover the data bits and the reference sequence bits. In some examples, channel estimation is performed on the wireless communication channel based on the reference sequence bits.

According to sixth aspect is a method performed at a network node, including: mapping first data for a first station to a first bit of a quadrature phase shift keying (QPSK) symbol and second data for a second station to a second bit of the QPSK symbol; and transmitting the QPSK symbol in a frame as an radio frequency (RF) signal for the first station and the second station.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The operation and structure of example embodiments are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

Example embodiments are described in the context of WLAN communications systems that use superposed symbol constellations to improve communications performance. The embodiments may be applied to standards compliant WLAN communications systems, such as those that are compliant with specifications within the IEEE 802.11 group of standards, and non-standards compliant communications systems.

Figure 1:
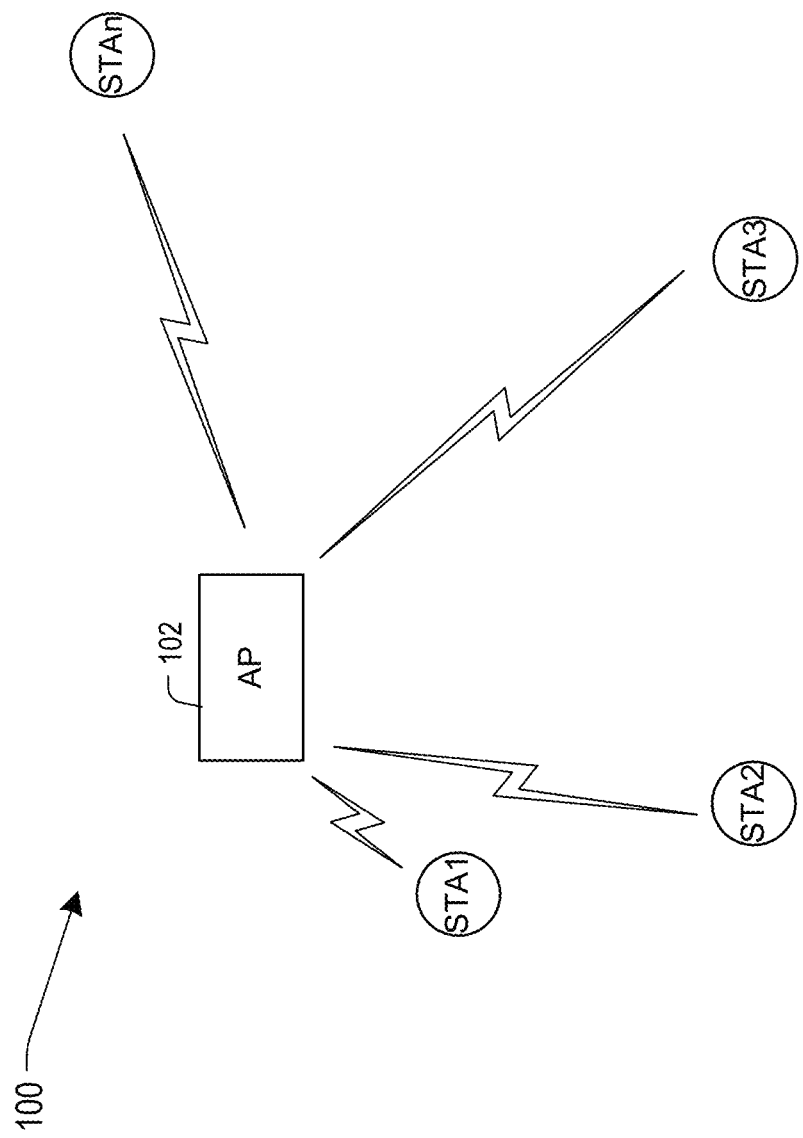
FIG. 1 illustrates an example communications system according to example embodiments.

FIG. 1 illustrates an example wireless communications system 100. Communications system 100 includes an access point (AP) 102 that may serve a plurality of stations (STAs), such as STA1, STA2, STA3 to STA N (generically referred in the singular as STA and in the plural as STAs). AP 102 may schedule transmission opportunities for the STAs and signal information regarding the transmission opportunities to the STAs. STAs may receive transmissions or make transmissions in accordance with the scheduled transmission opportunities. AP 102 and STAs may implement example embodiments presented in this disclosure.

In example embodiments, APs 102 may be base stations, evolved NodeBs (eNBs), NodeBs, controllers, base terminal stations, and other transceiver devices. Similarly, STAs may be receiving devices, electronic devices, mobile stations, mobiles, terminals, user equipment (UEs), machine-type communication devices and other devices that are enabled to receive RF signals. Although it is understood that communications systems may employ multiple APs 102 capable of communicating with a number of STAs, only one AP 102 and a corresponding group of STAs are illustrated in FIG. 1 for simplicity.

The STAs may have different quality communications links with AP 102. For example, different STAs can be located at different distances from AP 102. STA1 may be located in close proximity to AP 102 and may have a high signal to noise ratio (SNR), e.g., 20 dB, and STA2 may be remotely located with respect to AP 102 and may have a low SNR, e.g., 5 dB or 8 dB. It is noted that the distance between the AP 102 and a STA is not the only factor in channel quality (low SNR vs high SNR). For example, intervening objects such as structures, walls, vegetation and precipitation can also impact received signal quality. Although the present discussion focuses on two STAs (high SNR STA1 and low SNR STA2), the example embodiments presented herein are operable with any number of STAs.

According to an example embodiment, adaptive power allocation is combined with the superposed symbol constellations of SOMA to produce a multiple access radio technology that offers improved capacity of communications channels and un-equal protection of data for different STAs. In example embodiments, new quadrature amplitude modulation (QAM) constellation formats are introduced. To provide context for embodiments that will be described below, FIG. 2 illustrates an example of a QPSK (also known as 4 QAM) constellation according to the IEEE.802.11ac specification, and FIG. 3 illustrates an example of a 16 QAM constellation according to the IEEE.802.11ac specification.

Figure 2:
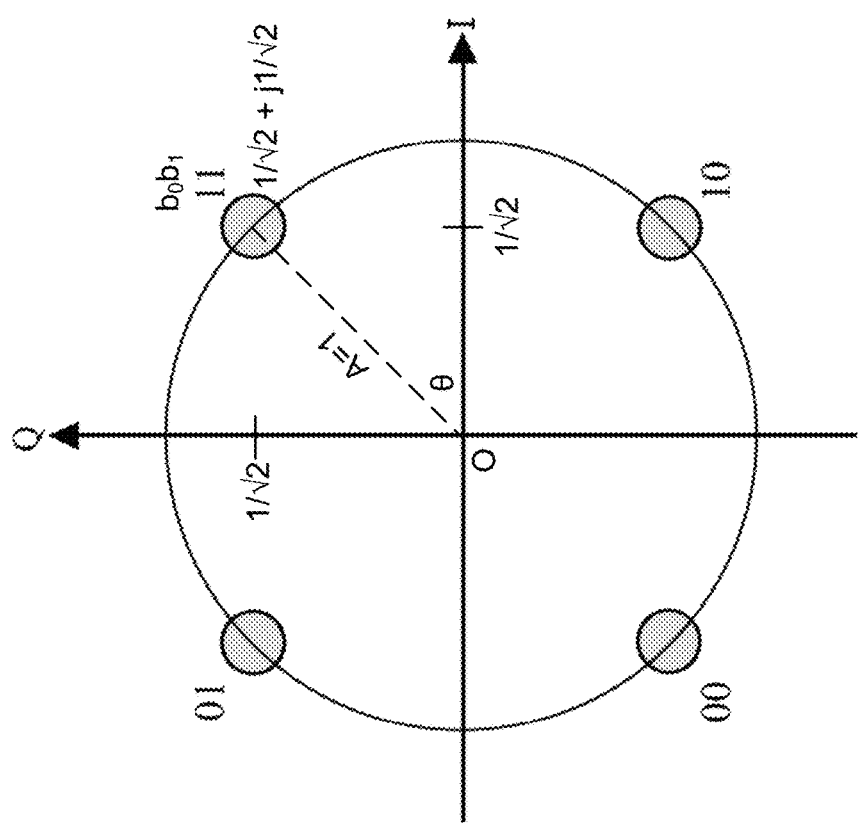
FIG. 2 shows a 802.11ac QPSK constellation.

In the 802.11ac QPSK constellation of FIG. 2, each constellation point represents a symbol $b_0 b_1$ that encodes 2 bits. Each constellation point (and its corresponding symbol) can be represented relative to the in-phase amplitude axis (I) and the quadrature-phase amplitude axis (Q) as real and imaginary rectangular coordinates (Si*cos θ, Si*sin θ) or Si*cos θ+j(Si*sin θ), where Si is the amplitude of the symbol (e.g. the distance from the origin O to the constellation point) and θ is the symbol phase angle relative to the in-phase axis I. The power of a symbol is $P_{Si}=|Si|^2/2$. Thus, symbol power is proportional to the square of symbol amplitude. The energy of a symbol is power times the symbol duration: $E_{Si}=T(|Si|^2/2)$. Because each symbol conveys b bits, the average bit energy is $E_b=E_{Si/b}$. The average symbol energy $\overline{E_s}$ for a given constellation can be computed as the average over all symbols. In the example of FIG. 2, the in-phase and quadrature-phase coordinates are scaled or normalized so that the average energy for all symbols is 1. In the case of 802.11ac QPSK, the normalization factor is $\sqrt{2}$. For example, in FIG. 2, the constellation symbol that represents bit pair $b_0b_1$ 11 has polar coordinates (Si=1, θ=45°) and rectangular coordinates $$\frac{1}{\sqrt{2}} + j\frac{1}{\sqrt{2}}.$$

The constellation symbols are mapped to bits using a Gray code such that adjacent constellation symbols vary by only a single bit.

Figure 3:
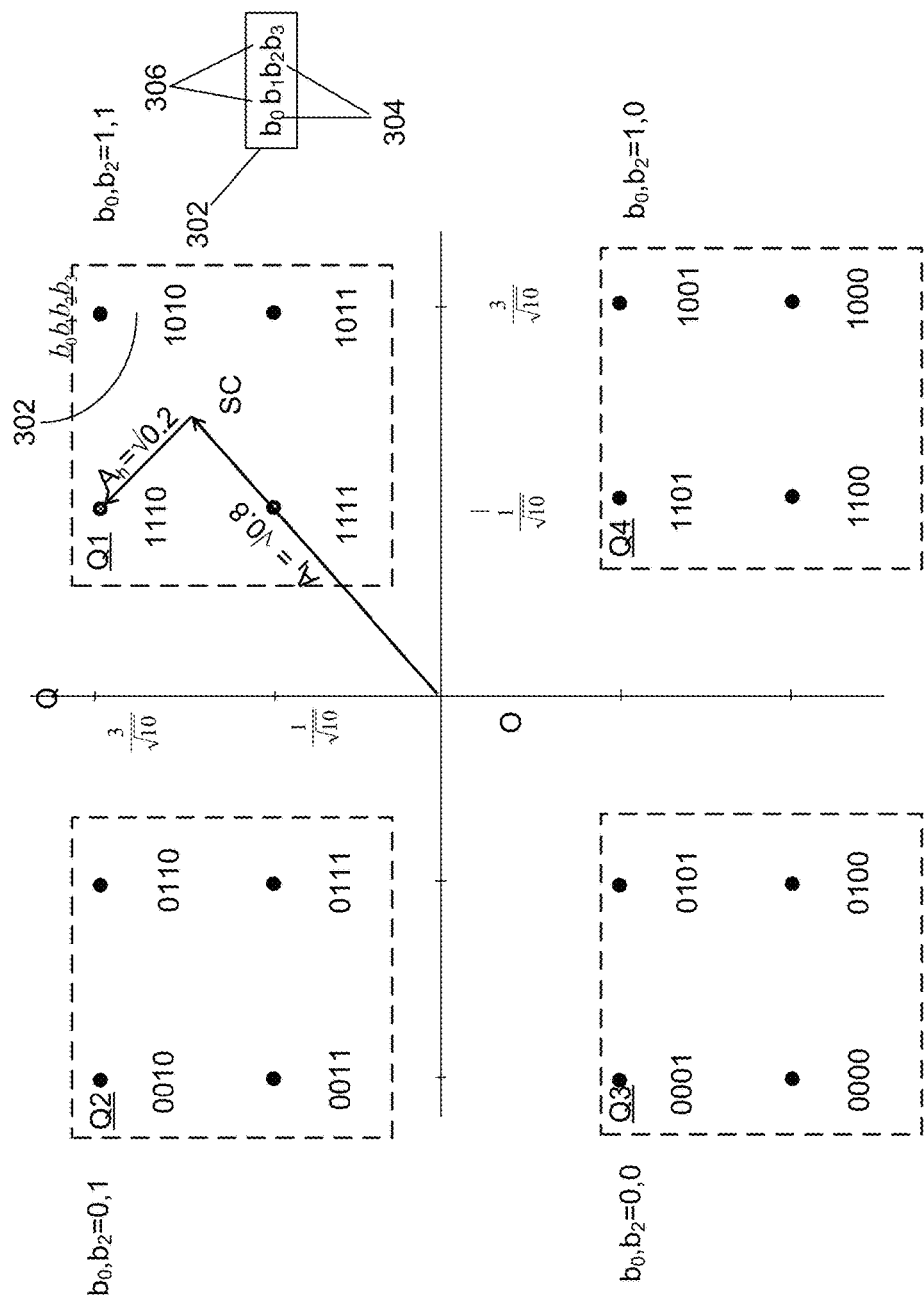
FIG. 3 shows a 802.11ac QAM-16 constellation.

In the 802.11ac 16 QAM constellation of FIG. 3, each constellation point represents a symbol 302 that encodes 4 bits ($b_0b_1b_2b_3$). In example embodiments, the 16 QAM constellation of FIG. 3 results from the superposition of two constituent constellations that each use a respective modulation layer. As used herein, the term constituent constellation refers to a constellation that is superposed with one or more other constituent constellations to form a superposed constellation. The term sub-constellation refers to the constellation symbols within one quadrant of a constellation.

The symbol 302 can be divided into a first sub-symbol 304 that includes bits $b_0,b_2$ and a second sub-symbol 306 that includes bits $b_1,b_3$. The first sub-symbol 304 ($b_0,b_2$) corresponds to a first constituent constellation that uses a lower modulation layer, namely QPSK. As can be seen in FIG. 3, the first sub-symbol bits $b_0,b_2$ remain the same within each quadrant Q1, Q2, Q3 and Q4, but change between quadrants. For example, $b_0,b_2$=1,1 for all four symbols in quadrant Q1, and $b_0,b_2$=0,1 for all four symbols in quadrant Q2. The second sub-symbol 306 ($b_1,b_3$) corresponds to a second constituent constellation that uses a higher modulation layer, namely 16 QAM. As can be seen in FIG. 3, the second sub-symbol bits $b_1,b_3$ are different for each symbol within a quadrant.

Accordingly, the sub-symbol 304 that includes bits $b_0,b_2$ can be decoded based on which quadrant it falls within. The inter-quadrant energy differences between the sub-symbols 304 representing different bit values for bits $b_0$ and $b_2$ are greater than the intra-quadrant energy differences between the sub-symbols 306 representing different bit values for bits $b_2$ and $b_4$. As represented in FIG. 3, the log-likelihood ratio (LLR) for bits $b_0$ and $b_2$ is the same and is based on a signal amplitude ($A_l$) represented by the distance from the constellation origin 0 to quadrant sub-constellation center SC. The LLR for bits $b_1$ and $b_3$ is based on a lower amplitude value ($A_h$) represented by the distance from the sub-quadrant constellation center SC to a sub-constellation symbol. In 802.11ac, the amplitude level $A_l$ is $\sqrt{0.8}$ and the amplitude level $A_h$ is $\sqrt{0.2}$.

Figure 4:
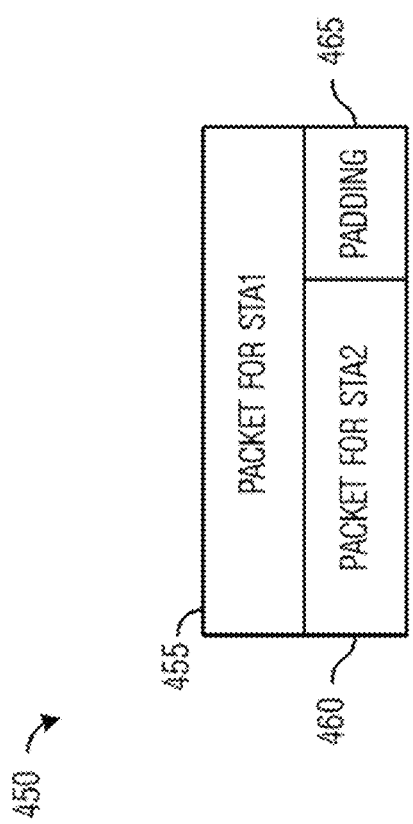
FIG. 4 illustrates a channel resource diagram for a WLAN using SOMA.

In 802.11ac, each QAM symbol is composed of bits for the same STA. However, in a system that treats a constellation as a set of superposed constituent constellations (such as SOMA), QAM symbols can be composed of bits for different STAs. The more reliable bits in a QAM symbol 302 can be scheduled for a STA with a lower SNR channel and the less reliable bits scheduled for a STA with higher SNR channel. The assignment of the more reliable bits to the lower SNR channel increases the probability of successful decoding. The assignment of less reliable bits to the higher SNR channel trades the probability of successful decoding for higher data rates. FIG. 4 illustrates a channel resource diagram 450 for a WLAN using a superposed constellation. With a superposed constellation, two or more STAs may be scheduled in a single channel or carrier. As shown in FIG. 4, the single channel or carrier may carry a frame for STA1 455 as well as a frame for STA2 460. Padding 465 may be used if needed to match the size of frame for STA1 455 and frame for STA2 460. Although shown in FIG. 4B as supporting two transmissions, transmissions to two or more stations may be supported with an upper limit on the number of simultaneous transmissions being set by the size of the superposed QAM constellation being used.

In the QAM constellations of 802.11ac, the relative in-phase and quadrature phase amplitudes of each symbol 302 remain constant for that symbol 302, and thus the relative location of each symbol in the constellation remains constant. In 802.11ac, the constellation symbols are normalized such that the average energy over all symbols within each quadrant is 1. In 802.11ac 16 QAM, 64 QAM and 256 QAM, each constellation symbol is normalized by a normalization factor of $\sqrt{10}$, $\sqrt{42}$ and $\sqrt{170}$, respectively.

Figure 5:
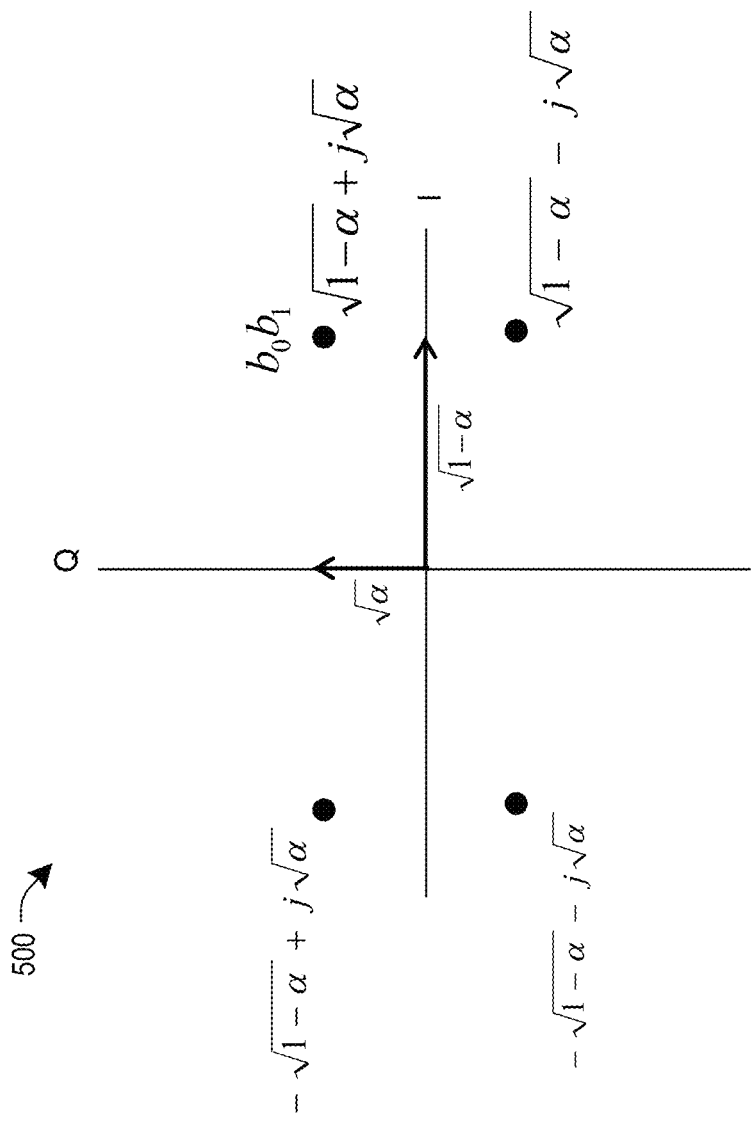
FIG. 5 shows a QPSK constellation according to an example embodiment.

In example embodiments described herein, new symbol constellations are introduced that vary from known 802.11ac constellations in that an adaptive power allocation factor can be applied to control the power allocations to each constituent constellation. In this regard, FIG. 5 illustrates an example of a new QPSK symbol constellation 500 according to an example embodiment. In the 802.11ac QPSK constellation, the quadrature and in-phase amplitude values for each symbol are the same, namely $\sqrt{0.5}$. However, in the QPSK symbol constellation 500 the quadrature and in-phase amplitude values for each symbol can vary in accordance with a predetermined relationship based on an adaptive power allocation factor α. In FIG. 5, the quadrature phase amplitude level of each constellation symbol is $\sqrt{\alpha}$ and the in-phase amplitude level is $\sqrt{1-\alpha}$. The QPSK constellation 500 is a superposition of a binary phase shift keying (BPSK) constellation and a quadrature binary phase shift keying (QBPSK) constellation, with the BPSK constellation existing only on the in-phase or real axis and the QBPSK constellation existing only on the quadrature phase or imaginary axis.

Figure 6:
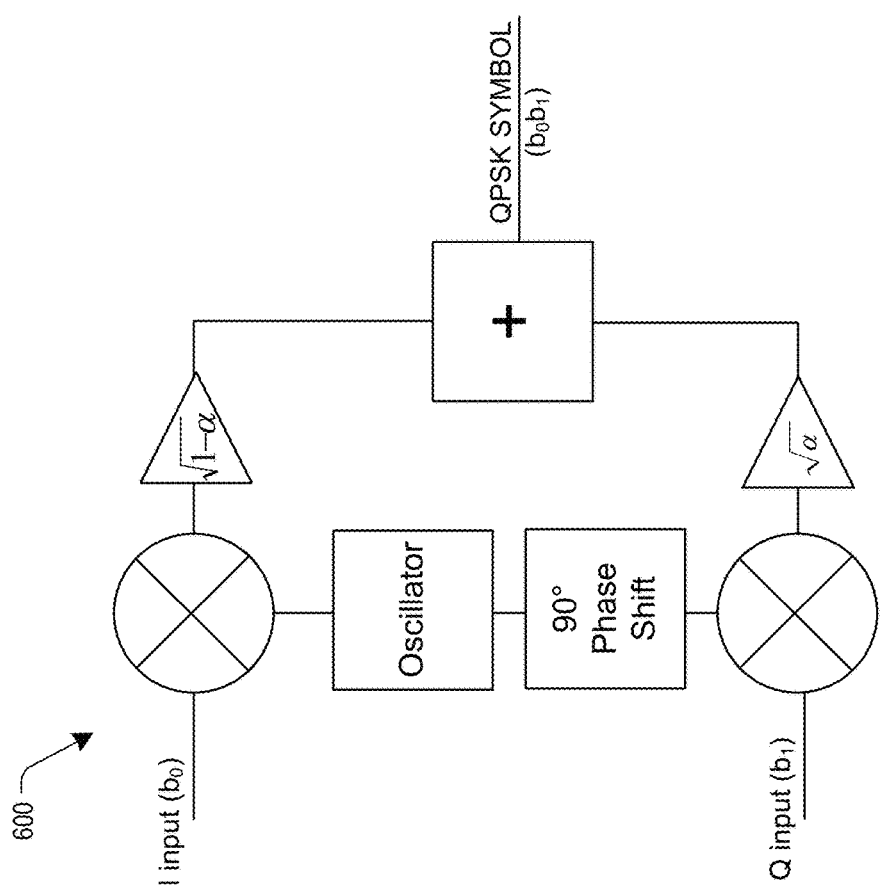
FIG. 6 is a block diagram of a QAM modulator.

FIG. 6 is a block diagram representation of a QAM modulator 600 that outputs a signal that includes successive QPSK symbols $b_0b_1$ of the QPSK constellation 500. As indicated in FIG. 6, data (−1 or 1) for BPSK sub-symbol $b_0$ can be applied to an in-phase input I, and adjusted to an amplitude level of $\sqrt{1-\alpha}$, and data (−1 or 1) for QBPSK sub-symbol $b_1$ can be applied to a quadrature phase input Q, and adjusted to an amplitude level of $\sqrt{\alpha}$, resulting in the following possible QPSK symbols: $\sqrt{1-\alpha}+j\sqrt{\alpha}$; $-\sqrt{1-\alpha}+j\sqrt{\alpha}$; $-\sqrt{1-\alpha}-j\sqrt{\alpha}$; or $\sqrt{1-\alpha}-j\sqrt{\alpha}$.

For the case of α=0.5, the QPSK constellation 500 will be identical to the 802.11ac QPSK constellation.

In superposed QPSK constellation 500, power can be adaptively allocated between the BPSK and QBPSK constituent constellations by adjusting the power allocation factor α. Increasing the power allocation factor α increases the distance between the QBPSK sub-symbols in constellation 500 (improving the reliability of QBPSK sub-symbol $b_1$) and decreases the distance between the BPSK sub-symbols in constellation 500 (decreasing the reliability of BPSK sub-symbol $b_0$). Decreasing the power allocation factor α has the opposite effect.

In some example embodiments, BPSK sub-symbol $b_0$ with in-phase amplitude level $\sqrt{1-\alpha}$ can be used to encode data bits that are intended for one STA and the QBPSK sub-symbol $b_1$ with quadrature phase amplitude level $\sqrt{\alpha}$ can be used to encode data bits that are intended for another STA. In the case where the power allocation factor $\alpha<0.5$, the BPSK sub-symbol $b_0$ will be the most reliable bit (MRB) and can be used for the lower SNR channel (e.g. for far STA2), and the QBPSK sub-symbol $b_1$ will be the least reliable bit (LRB) and can be used for the higher SNR channel (e.g. near STA1). In an example where the BPSK sub-symbol $b_0$ is intended for far STA2 and the QBPSK sub-symbol $b_1$ is intended for near STA1, then each of the far STA2 and near STA1 can demodulate the received superposed QPSK symbol the same way a station would demodulate a conventional QPSK symbol, and ignore the bit that that was not intended for it. Alternatively, the far STA2 can just process the received superposed QPSK symbol as a BPSK symbol and treat the quadrature phase portion of the signal as noise. In some example embodiments, the received QPSK symbol can be separated at the receiving STA into in-phase and quadrature phase components during RF processing prior to digital baseband processing.

In some embodiments, as an alternative to using each of the sub-symbol bits $b_0$ and $b_1$ of the QPSK symbol $b_0b_1$ as data bits for different stations, the bits can each be used for different purposes. For example one bit can be used as a data bit and the other bit used as a training signal for channel estimation. The data bit and the training bit could be used by the same STA, or the data bit used by one STA and the training bit used for another STA.

Figure 7:
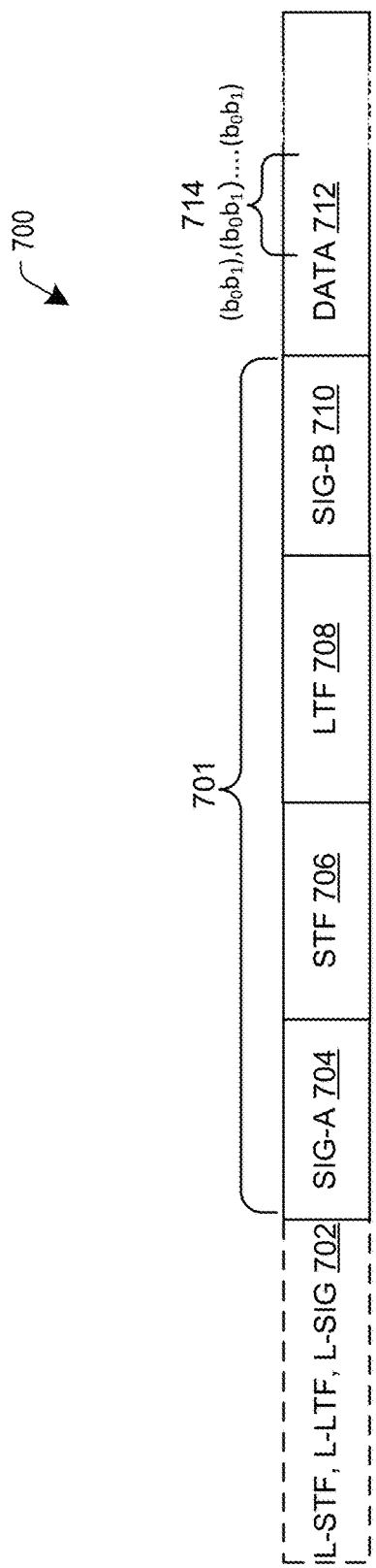
FIG. 7 is a diagram of a frame.

In the context of using one bit of a QPSK symbol $b_0b_1$ for a reference signal for channel estimation, in one example the QPSK symbol can be incorporated into a Physical Layer Convergence Protocol (PLCP) Protocol Data Unit (PPDU). In this regard, FIG. 7 shows an example of a frame 700 that is similar to an 802.11ac PPDU structure. The frame 700 can include legacy fields 702 for backwards compatibility with stations that are not configured to process superposed constellations. The legacy fields are followed by a preamble 701 intended for non-legacy stations that are enabled to process superposed constellations such as QPSK constellation 500. The preamble 701, which may for example be encoded using a lower layer modulation such as BPSK, QBSK, or a combination thereof, includes SIG-A field 704, short training field (STF) 706, long training field (LTF) 708, and SIG-B field 710. Data field 712 follows the preamble 701. The SIG-A field 704 can be used to signal that the Frame 700 is a non-legacy frame. Data field 712 may also contain the information required to interpret subsequent frames, including for example bandwidth, number of streams, guard interval, coding, modulation and coding scheme (MCS) and beamforming. The STF field 704 is used to improve automatic gain control estimation in Multiple Input Multiple Output (MIMO) transmission. The LTF field 708 includes long training sequences that provide a means for the receiver to estimate a channel between transmit and receive antennas. The number of LTF fields 708 can vary depending on the total number of space-time streams. The SIG-B field 710 includes information that describes the length of the data and the modulation and coding scheme (MCS) for single or multi-user modes.

In some example embodiments, the data field 712 could include multiple successive QPSK symbols $b_0b_1$ having one bit dedicated to data and one bit for channel estimation purposes. In some examples, QPSK symbols $b_0b_1$ having a channel estimation bit could be included only at selected locations within the data field 712, including for example as one or mid-ambles 714 at locations at or close to the middle of the data field 712 or at locations at pre-determined intervals in the data field 712. In cases where data field 712 has a long duration, the channel estimation carried out during the preamble 701 might not remain accurate for the entire duration of the transmission. Accordingly, mid-amble 714 provides an opportunity for a receiver to update a prior channel estimation.

In one example, the same LTF sequence of bits used for the BPSK modulated LTF field 708 of preamble 701 is retransmitted in the mid-amble 714 using the successive QPSK symbols $b_0b_1$. One bit of each QPSK symbol $b_0b_1$ is used for one of the LTF sequence bits, and the other bit of the QPSK symbol $b_0b_1$ is used to carry data. For example, QBPSK sub-symbol bit $b_1$ may be as a data bit, and BPSK sub-symbol bit $b_0$ may be used as LTF sequence bit. In example embodiments, the receiver STA is pre-informed of the location of the mid-amble 714 within the data field 712, as well as the particular power allocation and anticipated constellation location for the reference signal bit in the QPSK symbols $b_0b_1$. Upon receiving and decoding the QPSK symbols $b_0b_1$ of mid-amble 714, the receiver STA can perform channel estimation using the LTF sequence bits, and this information can then be used by the receiver STA to supplement and refine the channel estimation done earlier in respect of the sequences included in the LTF field 708. In this regard the QPSK symbol $b_0b_1$ can be used as a mid-amble 714 training signal that can, among other things, be used to compensate for any channel changes that may have occurred since the preamble 701 was received. As noted above, the bit of the QPSK symbol $b_0b_1$ that is not dedicated for channel estimation purposes can be used to encode data for the receiver STA. The use of superposed a QPSK symbol $b_0b_1$ still allows data to be transmitted during the mid-amble 714, and may therefore lower the overhead cost of including a mid-amble 714.

In a further embodiment, one bit of the QPSK symbol $b_0b_1$ could be used for control signaling, including for example to indicate the number of training signal mid-ambles 714 in the Frame 700. In some examples, the control signaling bit could be used to indicate what type of QAM constellation will be used for data following a mid-amble 714 in cases where a QPSK constellation is used for the mid-amble and a different QAM constellation is used after the mid-amble.

Figure 8A:
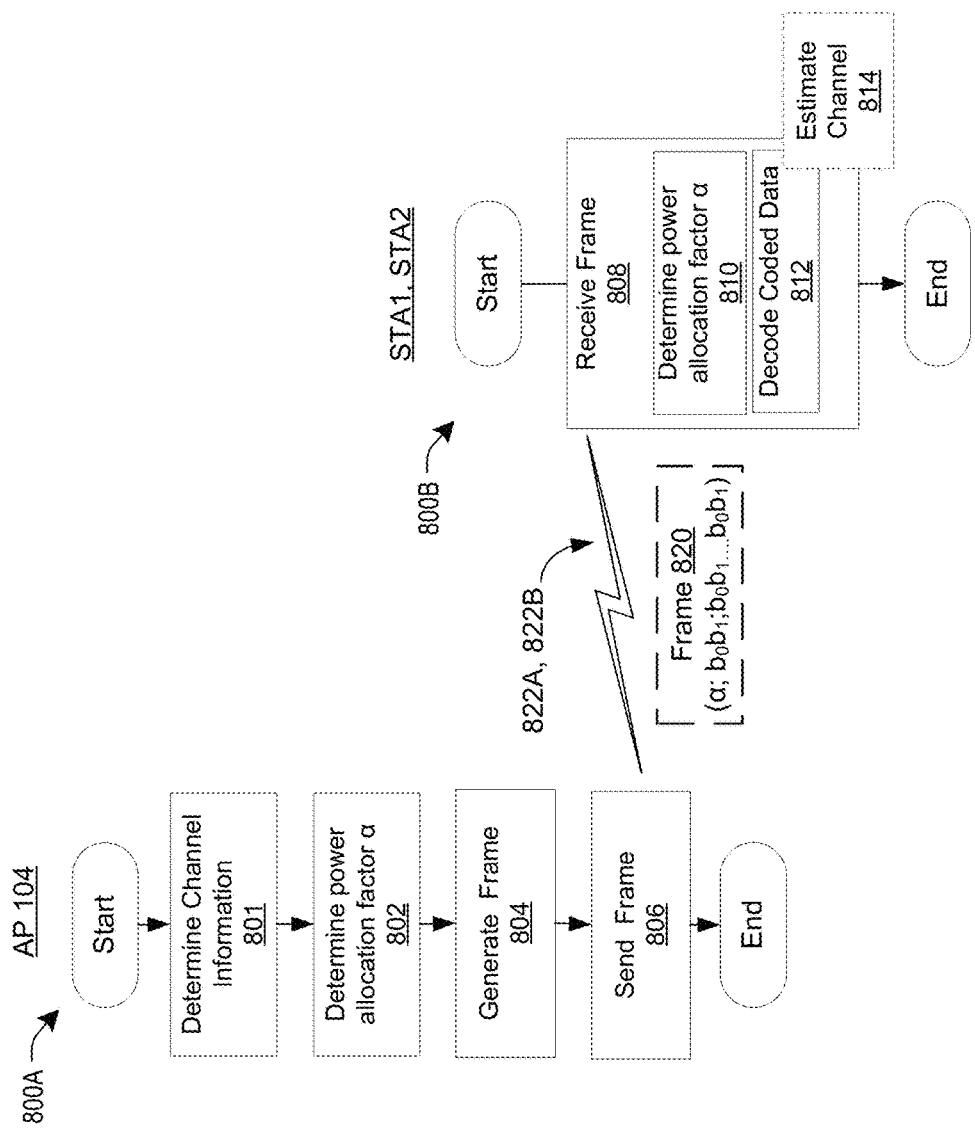
FIG. 8A is flow diagram showing actions taken at an access point and stations according to an example embodiment.

FIG. 8A shows a method 800A performed at AP 102, and a method 800B performed at each of STA1 and STA2, according to a first example embodiment. In methods 800A, 800B, superposed QPSK constellation 500 is used for successive QPSK symbols $b_0b_1$ included in a downlink message frame 820 transmitted from AP 102 for both STA1 and STA2. When method 800A starts, AP 802 has data for delivery to both STA1 and STA2 through respective channels 822A, 822B. AP determines channel information for channels 822A, 822B (step 801). Channel information can be derived from different sources, including from the STAs. The channel information may be in the form of channel quality indicators (CQI), channel state information (CSI), or other information related to channel quality, channel condition, and the like.

The AP 104 determines a power allocation factor $\alpha$ to use for QPSK constellation 500 in accordance with the channel information, and also determines what modulation (BPSK or QBPSK) to will be assigned to each STA (step 802). As noted above, the power allocation factor $\alpha$ determines the relative allocation of energy along the quadrature amplitude axis and the in-phase amplitude axis. By way of illustrative example, AP 104 may select a power allocation factor $\alpha<0.5$ (for example 0.4) in which case, as noted above, the BPSK sub-symbol $b_0$ is the MRB and can be assigned to the lower SNR channel (e.g. far STA2), and the QBPSK sub-symbol $b_1$ is the LRB and can be assigned to the higher SNR channel (e.g. near STA1).

The AP 104 then generates the frame 820 (step 804). In example embodiments, information identifying the power allocation factor $\alpha$ is embedded in the frame 820, along with information indicating what sub-symbol has been assigned to each station. One or more QPSK symbols $b_0b_1$ are included in the frame 820 after the power allocation factor $\alpha$ and station assignment information. Data bits for one STA are encoded using one of the bit sub-symbols $b_0$ or $b_1$, and data bits for the other STA are encoded using the other bit sub-symbol $b_0$ or $b_1$. The frame 806 is then transmitted by the AP 104 in channels 822A, 822B (step 806). In an example, channels 822A, 822B are respective spatial streams that use the same frequency and time resources. In some examples, AP104 transmits a common stream for both channels 822A, 822B.

Referring to method 800B, on the receiver side, STA1 receives frame 820 through channel 822A, and STA2 receives frame 820 through channel 822B (step 808). Each STA decodes symbols included in the frame 820 as the symbols are received, enabling each STA to determine the power allocation factor $\alpha$ and station sub-symbol assignment (step 810) prior to decoding any received QPSK symbols $b_0b_1$. Each of STA1 and STA2 then decode the received QPSK symbols $b_0b_1$ to extract their respective data bits (step 812). As suggested above, different decoding configurations are possible. In one example, one or both of STA1, STA2 can be configured to decode both bits of the received QPSK symbols $b_0b_1$ and then ignore the bit that is not assigned to it. In another example, one or both of STA1, STA2 can be configured only to decode the sub-symbol assigned to it. For example, STA2 can just process the received superposed QPSK symbol as a BPSK symbol and treat the quadrature phase portion of the signal as noise.

Figure 8B:
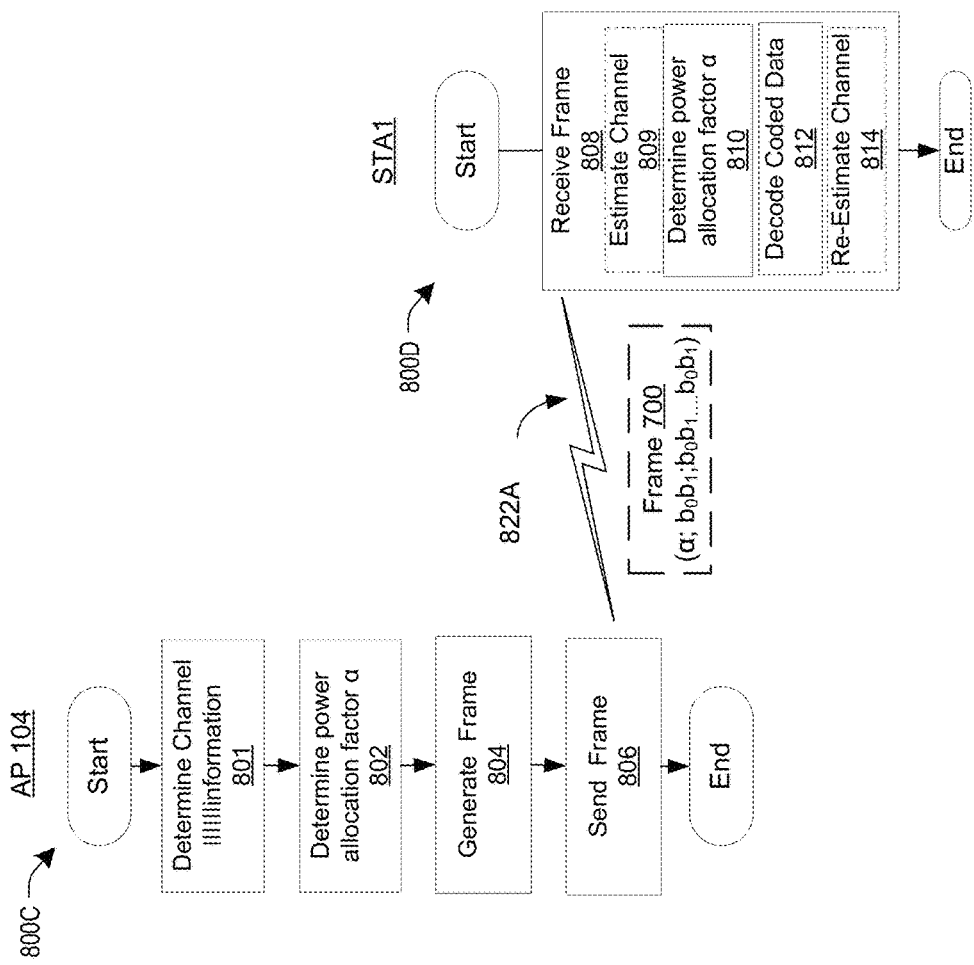
FIG. 8B is flow diagram showing actions taken at an access point and a stations according to another example embodiment.

As indicated above, in an alternative embodiment superposed QPSK constellation 500 is used for successive QPSK symbols $b_0b_1$ included in a frame for the dual purpose of transmitting a data bit and a signaling bit for a receiving STA (for example STA1). In one example, the signaling bit is a bit from a sequence used for channel estimation. In this regard, FIG. 8B illustrates methods 800C and 800D performed at AP 104 and STA1, respectively, in the context of this alternative embodiment. When method 800C starts, AP 802 has data for delivery to STA1 through channel 822A. AP determines channel information for channel 822A, (step 801) in a manner similar to that stated above. AP 104 determines a power allocation factor $\alpha$ to use for QPSK constellation 500 in accordance with the channel information, and also determines which modulation (BPSK or QBPSK) is assigned for use as a data bit and as a signaling bit. By way of illustrative example, AP 104 may assign the MRB for the data bit, and the LRB for the signaling bit.

The AP 104 then generates a frame (step 804) which in the illustrated embodiment has a format as described above in respect frame 700 of FIG. 7. In example embodiments, information identifying the power allocation factor $\alpha$ is embedded in the frame preamble 701 (for example in SIG-B field 710), along with information indicating which sub-symbol has been assigned for the data bit and which has been assigned as a signaling bit. In some examples, information identifying the location of QPSK symbols $b_0b_1$ in the data field 712 is also included in preamble 701. One or more QPSK symbols $b_0b_1$ are included in the frame mid-amble 714. Data bits are encoded using one of the bit sub-symbols $b_0$ or $b_1$, and signaling bits are encoded using the other bit sub-symbol $b_0$ or $b_1$. The frame 700 is then transmitted by the AP 104 in channels 822A (step 806).

Referring to method 800D, on the receiver side, STA1 receives frame 700 through channel 822A. STA1 decodes symbols included in the frame as the symbols are received. In an example embodiment, preamble 701 includes one or more training fields (for example LTF 708) that include channel estimation sequences, and STA1 uses this information to estimate channel 822A (step 809). In example embodiments, STA1 also decodes information in the preamble 701 that identifies allocation factor $\alpha$, the sub-symbol assignments, and the location of mid-amble 714 (step 810). STA1 then decodes the received QPSK symbols $b_0b_1$ in mid-amble 714 to recover the data bit and the signaling bit included in each symbol (step 812). In the case where the signaling bits are used to transmit a channel estimation sequence, STA1 can perform an updated channel estimation (step 814).

In some examples of methods 800c, 800d, one or more of the power allocation factor, sub-symbol assignments and mid-amble location are pre-known by the STA1 before transmission of the frame and thus do not need to be included in the transmitted frame. In some examples, the signaling bit could be used by one STA and the data bit could be used by another STA.

Figure 9:
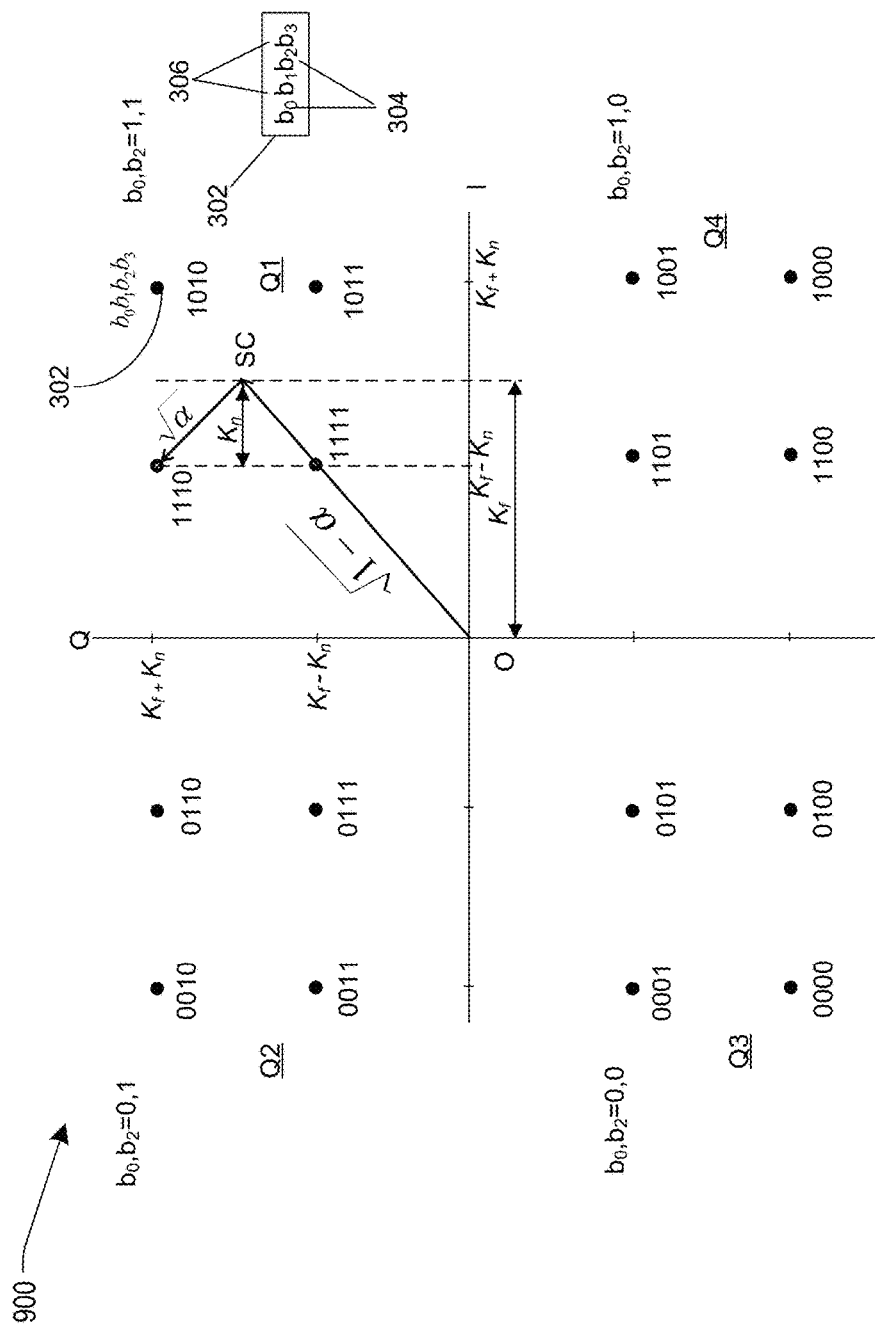
FIG. 9 shows a superposed 16 QAM constellation according to an example embodiment.

Other QAM constellations will now be described according to further example embodiments. FIG. 9 illustrates an example of a 16 QAM symbol constellation 900 according to an example embodiment. The 16 QAM symbol constellation 900 is Gray coded in the same manner as the 802.11ac 16 QAM constellation, with each constellation symbol representing a four bit symbol 302 ($b_0b_1b_2b_3$). Four bit symbol 302 $b_0b_1b_2b_3$ includes lower modulation sub-symbol 304 ($b_0,b_2$) and higher modulation sub-symbol 306 ($b_1,b_3$). In example embodiments the relative power allocations for the constituent constellations can be adjusted according to power allocation factor $\alpha$. Each quadrant Q1, Q2, Q3 includes a respective square 4-symbol sub-constellation. As illustrated in FIG. 9, in quadrant Q1, the amplitude level from the constellation origin O to the center SC of the quadrant Q1 sub-constellation is $\sqrt{1-\alpha}$, and the amplitude level from the center SC of the quadrant Q1 sub-constellation to Q1 constellation symbol 1110 is $\sqrt{\alpha}$. Accordingly, increasing the power allocation factor $\alpha$ results in a greater power allocation for the higher modulation layer constituent constellation associated with sub-symbol 306 ($b_1,b_3$), and conversely also results in a decreased power allocation for the lower modulation layer constituent constellation associated with sub-symbol 304 ($b_0,b_2$). Thus, increasing the power allocation factor $\alpha$ will increase the reliability of the least reliable bits (LRBs) $b_1,b_3$ of higher modulation sub-symbol 306, and will also decrease the reliability of the most reliable bits (MRB's) $b_0$ and $b_2$ of lower modulation sub-symbol 304. Decreasing the power allocation factor $\alpha$ will have the opposite effect.

Figure 10:
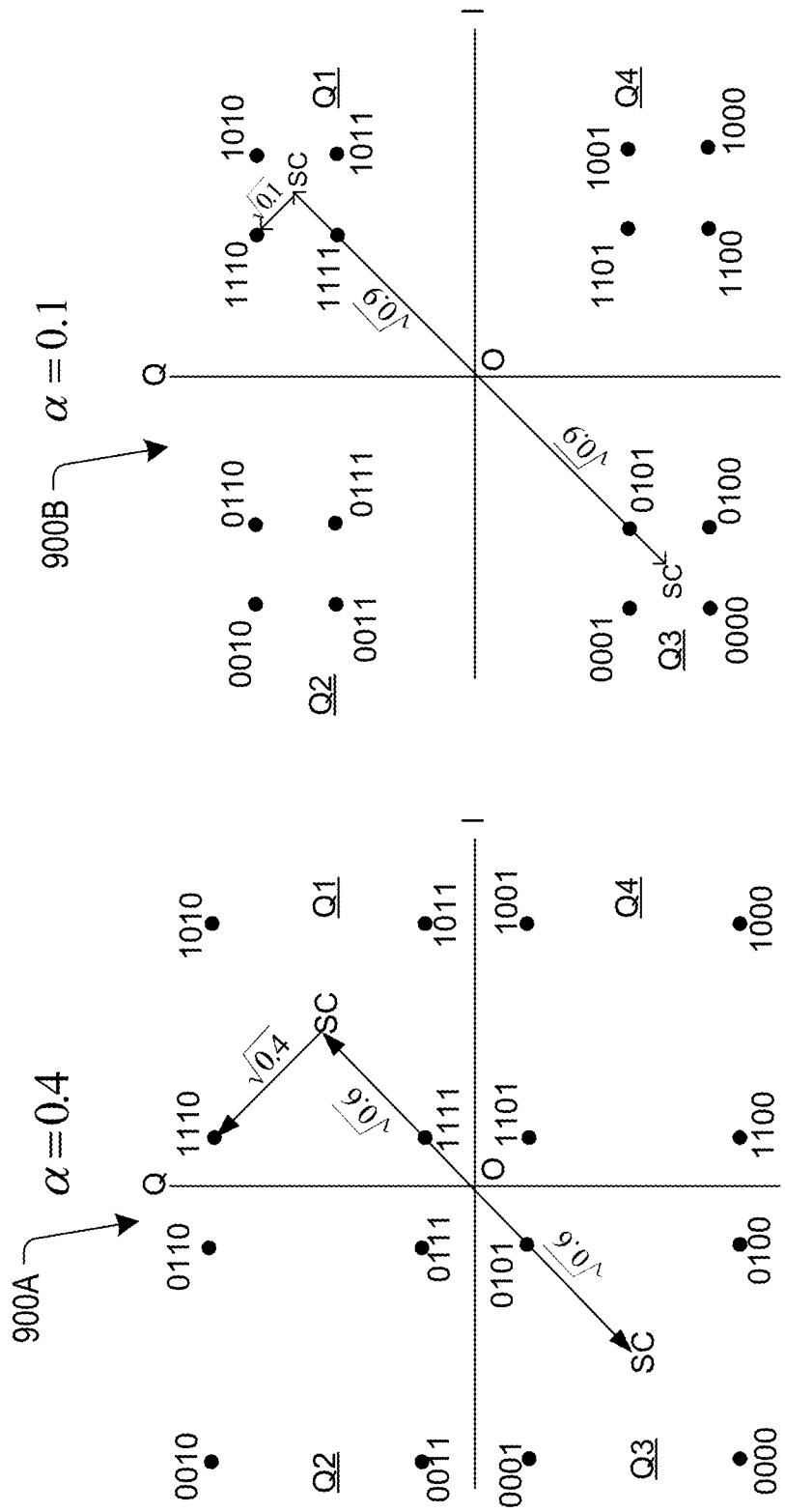
FIG. 10 shows the superposed 16 QAM constellation of FIG. 9 with two different power allocation factors.

By way of example, FIG. 10 graphically illustrates two examples of 16-QAM constellation 900 having a different power allocation factor $\alpha$. The left side of FIG. 10 illustrates a constellation 900A with power allocation factor $\alpha=0.4$, and the right side illustrates constellation 900B with power allocation factor $\alpha=0.1$. As can be seen in FIG. 10, the higher power allocation factor constellation 900A corresponds to greater distance between sub-constellation symbols within each respective quadrant and less distance between the sub-constellation center points SC of the respective quadrants, improving the reliability of the LRBs and decreasing the reliability of the MRBs. Conversely, the lower power allocation factor constellation 900B corresponds to closer sub-constellation symbols within each respective quadrant and further sub-constellation center points SC between the respective quadrants, improving the reliability of the MRBs and decreasing the reliability of the LRBs.

The power allocation factor $\alpha$ represents the average power of each constellation symbol. As the power allocation factor $\alpha$ increases, there is a proportional increase in the average energy of the symbols within each sub-constellation, and as the power allocation factor $\alpha$ decreases, there is a proportional decrease in the average energy of the symbols within each sub-constellation. Conversely, the energy offset between the sub-constellation centers decreases proportionally as the power allocation factor $\alpha$ increases, and increases proportionally as the power allocation factor $\alpha$ decreases.

Turning again to FIG. 9, in an example embodiment, the following two relationships can be used to provide rectangular coordinates for the 16 QAM symbols in constellation 900:

$$K_f = \frac{\sqrt{1-\alpha}}{\sqrt{2}} \quad \text{equation (1)}$$

Where:
$K_f$ is both the in-phase distance and the quadrature phase distance of the sub-constellation center-point SC of any of the sub-constellations of quadrants Q1, Q2, Q3 and Q4, as measured from the constellation origin O;
$\alpha$ is the adaptive power allocation factor and $0<\alpha<1$.

$$K_n = \frac{\sqrt{\alpha}}{\sqrt{2}} \quad \text{equation (2)}$$

Where:
$K_n$ is both the in-phase distance and the quadrature phase distance to a symbol within a quadrant from the center-point SC of the quadrant that contains the symbol.

Using $K_f$ and $K_n$, the symbols of constellation 900 can be represented in the following table:

TABLE 1

16 QAM Constellation

| INDEX | SYMBOL ($b_0b_1b_2b_3$) | COORDINATES I + jQ |
|---|---|---|
| 0 | 0000 | $(-K_f - K_n) + j(-K_f - K_n)$ |
| 1 | 0001 | $(-K_f - K_n) + j(-K_f + K_n)$ |
| 2 | 0010 | $(-K_f - K_n) + j(K_f + K_n)$ |
| 3 | 0011 | $(-K_f - K_n) + j(K_f - K_n)$ |
| 4 | 0100 | $(-K_f + K_n) + j(-K_f - K_n)$ |
| 5 | 0101 | $(-K_f + K_n) + j(-K_f + K_n)$ |
| 6 | 0110 | $(-K_f + K_n) + j(K_f + K_n)$ |
| 7 | 0111 | $(-K_f + K_n) + j(K_f - K_n)$ |
| 8 | 1000 | $(K_f + K_n) + j(-K_f - K_n)$ |
| 9 | 1001 | $(K_f + K_n) + j(-K_f + K_n)$ |
| 10 | 1010 | $(K_f + K_n) + j(K_f + K_n)$ |
| 11 | 1011 | $(K_f + K_n) + j(K_f - K_n)$ |
| 12 | 1100 | $(K_f - K_n) + j(-K_f - K_n)$ |
| 13 | 1101 | $(K_f - K_n) + j(-K_f + K_n)$ |
| 14 | 1110 | $(K_f - K_n) + j(K_f + K_n)$ |
| 15 | 1111 | $(K_f - K_n) + j(K_f - K_n)$ |

In the case of $\alpha=0.2$, 16 QAM constellation 900 is the same as the 802.11ac 16 QAM constellation.

In example embodiments, the lower modulation sub-symbol 304 that includes MRBs $b_0,b_2$ is used for the lower SNR STA, which in the present example is far STA2, and the higher modulation sub-symbol 306 that includes LRBs $b_1,b_3$, is used for the lower SNR STA, which in the present example is near STA1. The station that is the target receiver (e.g. far STA2) for the MRBs $b_0b_2$ can process the received symbol 302 as a QPSK symbol to decode MRBs $b_0b_2$ and can treat the LRBs $b_1b_3$ as noise. The station that is the target receiver (e.g. near STA1) for the LRBs $b_1b_3$ is required to demodulate the received symbol 302 as a 16 QAM symbol to decode LRBs $b_1b_3$. Accordingly, at least the station that is the target receiver (e.g. near STA1) for the LRBs $b_1b_3$ is pre-informed of the adaptive power allocation factor $\alpha$ to enable the station to demodulate the received symbol 302 and properly compute the LLR to determine LRBs $b_1b_3$.

Figure 11:
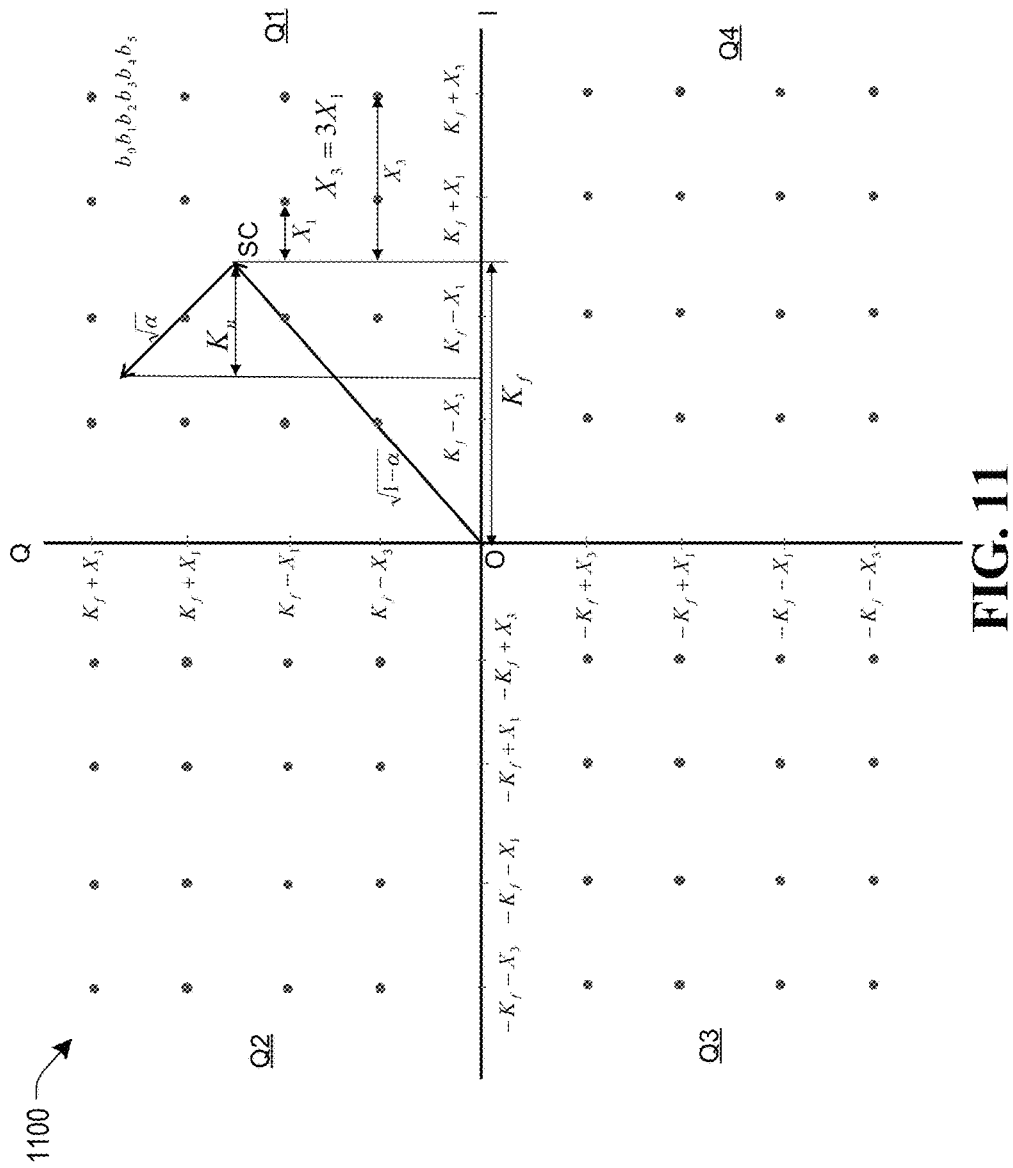
FIG. 11 shows a superposed 64 QAM constellation according to an example embodiment.

The use of adaptive power allocation between constituent constellations as disclosed above in respect of 16 QAM constellation 900 can also be applied to higher modulation level QAM constellations, including but not limited to 64 QAM and 256 QAM. In this regard, FIG. 11 illustrates an example of a 64 QAM symbol constellation 1100 according to an example embodiment. As illustrated in FIG. 11, each quadrant includes a sub-constellation of sixteen 6-bit symbols $b_0b_1b_2b_3b_4b_5$ arranged in a 4 by 4 grid, and each of the four sub-constellations has a respective sub-constellation center (labelled as SC in quadrant Q1, for example).

In 64 QAM symbol constellation 1100, the same Gray coding scheme is used as in an 802.11ac 64 QAM constellation. The 64 QAM symbol constellation 1100 can be divided into different numbers of constituent constellations each corresponding to a respective modulation layer and having a respective power allocation.

In the example illustrated in FIG. 11, 6-bit symbol $b_0b_1b_2b_3b_4b_5$ includes two constituent constellations that have respective power allocations. One constituent constellation includes a most reliable, lower modulation three bit sub-symbol $b_0b_2b_4$ corresponding to a power allocation of $1-\alpha$ and the other constituent constellation includes least reliable, higher modulation three bit sub-symbol $b_1b_3b_5$ corresponding to a power allocation of $\alpha$. The relationship between the power allocation factor $\alpha$ and the constellation distances can be represented using the equations (1) and (2) for $K_f$ and $K_n$, respectively. $K_f$ represents the same dimension for 64 QAM constellation 1100 as the QAM constellation 900, namely the in-phase distance and the quadrature phase distance from the constellation origin O to a quadrant center point SC. $K_n$ is determined as follows. In 64 QAM constellation 1100, X1 represents one-half of the in-phase distance and a one-half of the quadrature phase distance between adjacent symbols within a quadrant, and X3 is 3 times X1. $K_n^2$ is the median value between $X1^2$ and $X3^2$, such that $K_n^2=(X1^2+X3^2)/2$. Accordingly, $$X1 = \frac{K_n}{\sqrt{5}} \text{ and } X3 = 3\frac{K_n}{\sqrt{5}}.$$

As shown in FIG. 11, the positive in-phase I coordinate axis (real) values for the four columns of constellation symbols located in each of Q1 and Q4 are respectively:
$K_f-X_3; K_f-X_1; K_f+X_1; K_f+X_3$ The positive quadrature-phase Q coordinate axis (imaginary) values for the four rows of constellation symbols located in each of Q1 and Q2 are respectively:

$K_f-X_3; K_f-X_1; K_f+X_1; K_f+X_3$

The negative in-phase I coordinate axis (real) values for the four columns constellation symbols located in each of Q2 and Q3 are respectively:

$-K_f+X_3; -K_f+X_1; -K_f-X_1; -K_f-X_3$

The negative quadrature-phase Q coordinate axis (imaginary) values for the four rows of constellation symbols located in each of Q3 and Q4 are respectively:

$-K_f+X_3; -K_f+X_1; -K_f-X_1; -K_f-X_3$

Accordingly, each the 64 constellation symbols has an in-phase (I) coordinate value and a quadrature-phase coordinate value selected from the following set of possible coordinate values:

$-K_f-X_3; -K_f-X_1; -K_f+X_1; -K_f+X_3; K_f-X_3; K_f-X_1; K_f+X_1; K_f+X_3$

In the case of α=0.2381, 64 QAM constellation 1100 is the same as the 802.11ac 64 QAM constellation.

Figure 12:
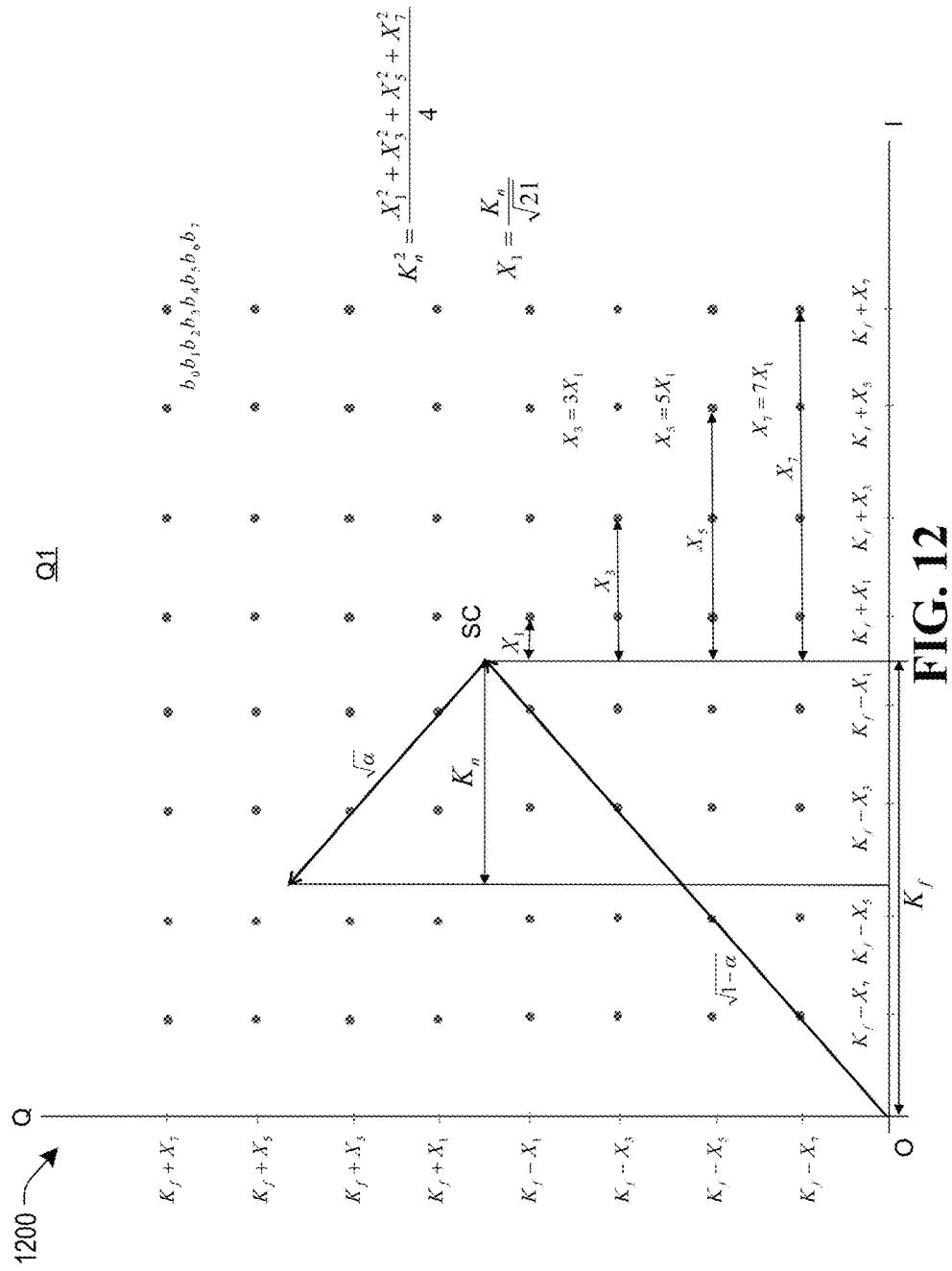
FIG. 12 shows a sub-constellation of a superposed 256 QAM constellation according to an example embodiment.

FIG. 12 illustrates an example of a 256 QAM symbol constellation 1200 according to an example embodiment. In particular, FIG. 12 illustrates the first quadrant Q1 of 256 QAM symbol constellation 1200. In 256 QAM symbol constellation 1200, the same Gray coding scheme is used as in an 802.11ac 256 QAM constellation, and each constellation symbol represents an 8-bit symbol $b_0b_1b_2b_3b_4b_5b_6b_7$. The 256 QAM symbol constellation 1200 can be divided into different numbers of constituent constellations each corresponding to a respective modulation layer and having a respective power allocation.

In the example illustrated in FIG. 12, 8-bit symbol $b_0b_1b_2b_3b_4b_5b_6b_7$ includes two constituent constellations that have respective power allocations. One constituent constellation includes a most reliable, lower modulation four-bit sub-symbol $b_0b_2b_4b_6$ corresponding to a power allocation of 1−α and the other constituent constellation includes least reliable, higher modulation four bit sub-symbol $b_1b_3b_5b_7$ corresponding to a power allocation of α. The relationship between the power allocation factor α and the constellation distances can be represented using the equations (1) for $K_f$ and (2) for $K_n$. The value $K_f$ represents the same dimension for 256 QAM constellation 1200 as the QAM constellation 900, namely the in-phase distance and the quadrature phase distance from the constellation origin O to a quadrant center point SC. $K_n$ is determined as follows. In 256 QAM constellation 1200, X1 represents half of the in-phase distance and half of the quadrature phase distance between adjacent symbols within a quadrant, and: X3 is 3 times X1; X5 is 5 times X1; and X7 is 7 times X1. $K_n^2$ is the median value among $X1^2$, $X3^2$, $X5^2$ and $X7^2$ such that $K_n^2 = (X1^2+X3^2+X5^2+X7^2)/4$. Accordingly, $$X1 = \frac{K_n}{\sqrt{21}}, X3 = 3\frac{K_n}{\sqrt{21}}, X5 = 5\frac{K_n}{\sqrt{21}}, \text{ and } X7 = 7\frac{K_n}{\sqrt{21}}.$$

As shown in FIG. 12, the positive in-phase I coordinate axis (real) values for the eight columns of constellation symbols located in each of Q1 and Q4 are respectively:

$K_f-X_7; K_f-X_5; K_f-X_3; K_f-X_1; K_f+X_1; K_f+X_3; K_f+X_5; K_f+X_7$

Similarly, the positive quadrature phase Q coordinate axis (imaginary) values for the eight rows of constellation symbols located in each of Q1 and Q2 are respectively:

$K_f-X_7; K_f-X_5; K_f-X_3; K_f-X_1; K_f+X_1; K_f+X_3; K_f+X_5; K_f+X_7$

The negative coordinate values are the negative of the values stated above.

Hence, in the quadrant Q1 of FIG. 12, each constellation symbol has an in-phase I coordinate value and a quadrature phase coordinate value selected the following set of possible coordinate values:

$K_f-X_7; K_k-X_5; K_f-X_3; K_f-X_1; K_f+X_1; K_f+X_3; K_f+X_5; K_f+X_7$

In the case of α=0.247, 256 QAM constellation 1200 is the same as the 802.11ac 256 QAM constellation.

Figure 13:
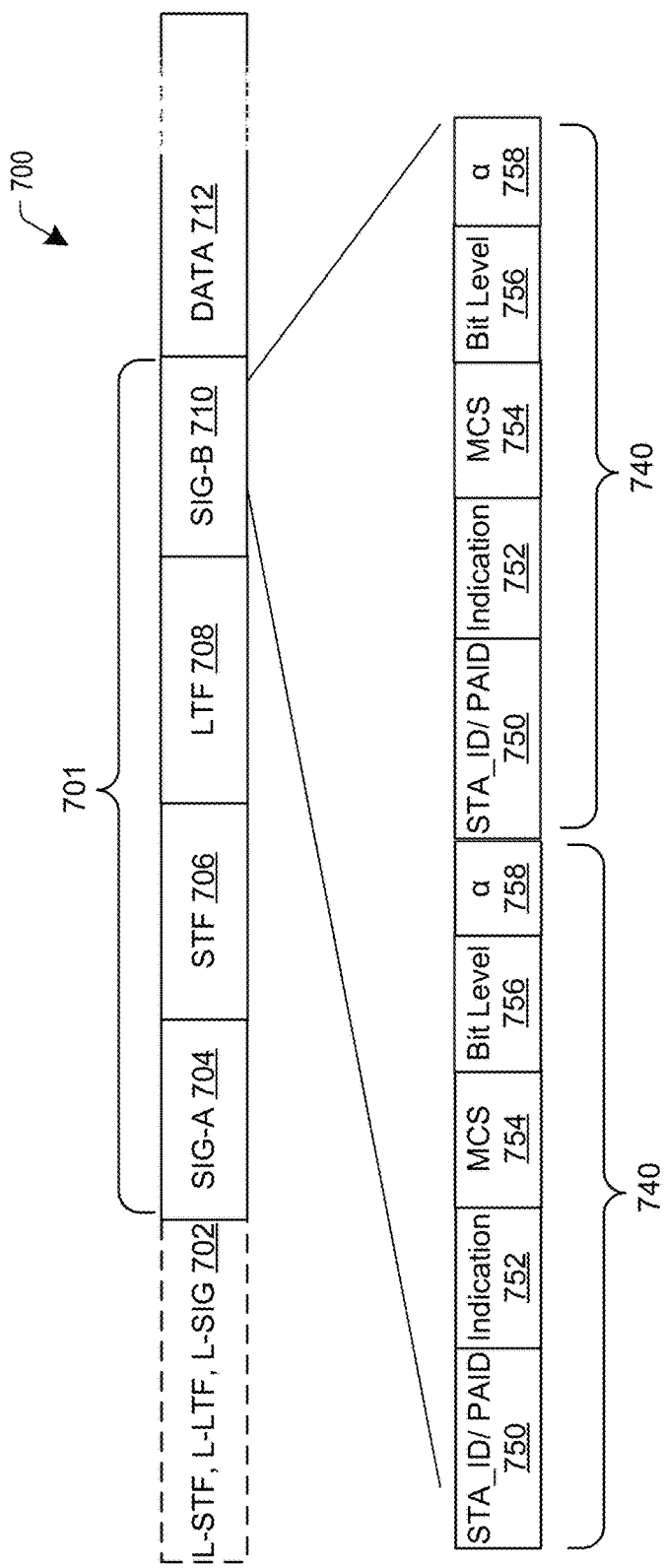
FIG. 13 is a diagram of a frame similar to the frame of FIG. 7, showing additional details.

A frame format for supporting the use of adaptive power superposed QAM constellation symbols will now be described. In example embodiments, a PPDU frame such as frame 700 (reproduced in FIG. 13) is used for transmitting the symbols, which may for example be located in the data field 712. Information to allow a receiving STA to decode the symbols is embedded in preamble 701. For example, in the case of both 64 QAM and 256 QAM and for at least the LRB receiving STA in 16 QAM, a receiving STA needs to be informed of the value of the power allocation factor α. Additional information that can be provided in the preamble 701 can include: information indicating that the frame 700 includes superposed constellation symbols (for example, an indication bit); assignment information indicating the assignment of constituent constellations (e.g. sub-symbol bits) to respective STAs (for example what bit positions in a symbol are intended for each STA); and constellation information identifying the type of the superposed QAM constellation (e.g. 16, 64 or 128 QAM). In an example embodiment, this information is embedded in the SIG-B field 710. FIG. 13 shows an example where SIG-B field 710 includes a STA attribute portion 740 for each STA (e.g. for STA1 and STA2).

Each STA attribute portion 740 includes: a STA_ID field 750 that identifies the STA that the information in the STA attribute portion 740 applies to; an indication bit 752 that indicates that the frame 700 includes superposed constellation symbols; an MCS field 754 that identifies the type of modulation coding scheme used for the STA (for example, if the superposed constellation is QPSK, 16 QAM, 64 QAM or 256 QAM); a bit level field 756 that identifies which bits in a constellation have been assigned to the STA (for example MSB or LSB); and a power allocation factor indication field 758 that identifies the power allocation factor α. In some examples, the power allocation factor field 758 has a size of N bits, with each unique combination of bits acting as index for a unique power allocation factor α. For example, for N=2, 3 or 4, the power allocation factor field 758 can respectively be used to as an index for 4, 8, or 16 different power allocation factor α levels. In an example embodiment, at least one of the possible index values for the power allocation factor field 758 is assigned to indicate that the superposed constellation is an 802.11ac constellation. For example, a specific bit combination in the power allocation factor field 758 indicates that α=0.5 for QPSK SOMA constellation, α=0.2 for 16 QAM SOMA constellation, α=0.2381 for 64 QAM SOMA constellation, and α=0.247 for 256 QAM SOMA constellation.

Figure 14:
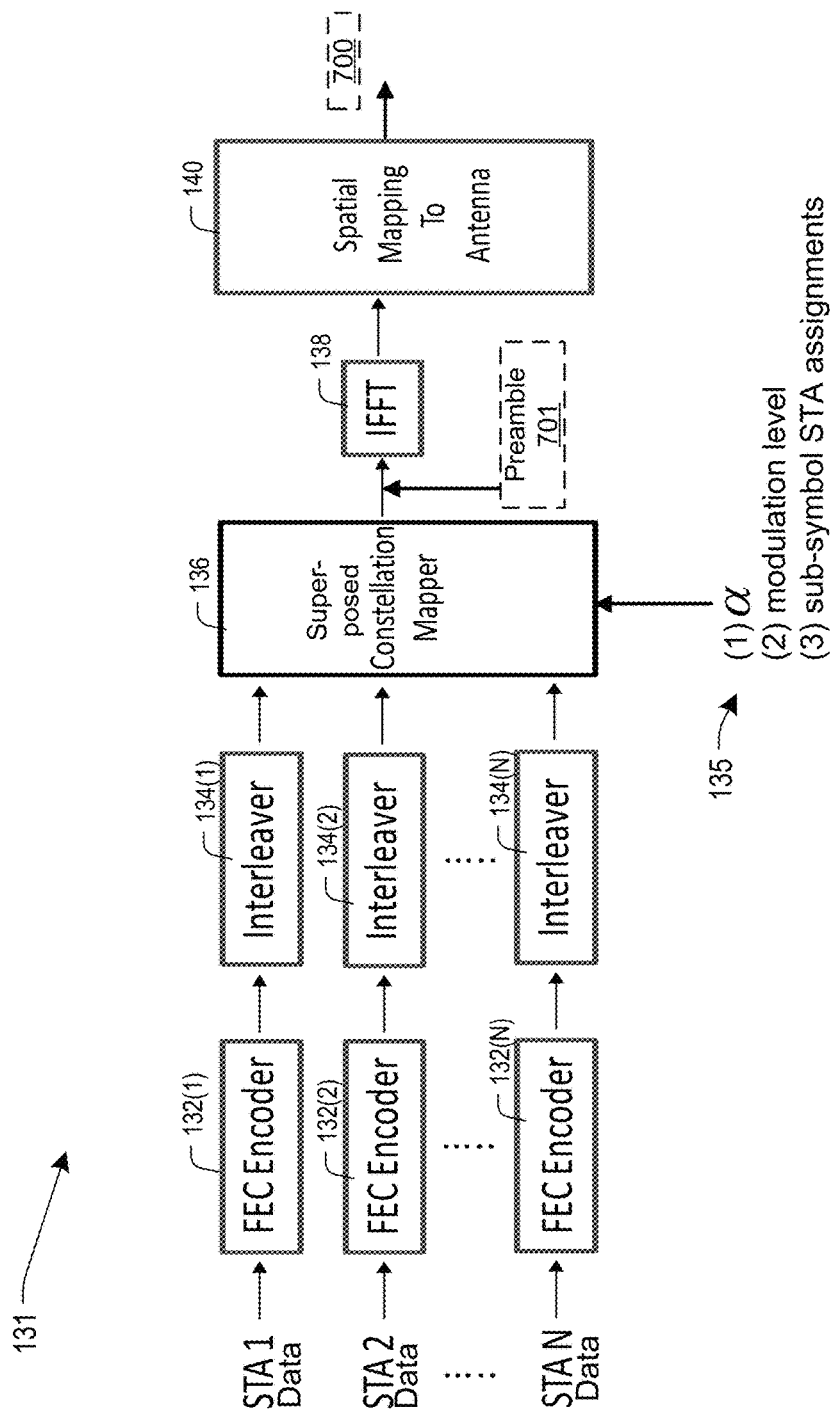
FIG. 14 shows operations performed out at an access point according to an example embodiment.

FIG. 14 shows, according to an example embodiment, baseband operations 131 that are performed at AP 104 to populate a frame 700 with station specific data scheduled for multiple STAs. Baseband operations 131 represent operations that may be performed in a single input single output (SISO) scheduling environment.

Prior to performing baseband operations 131, AP 104 will have determined channel information for each of the scheduled STAs. As noted above, the channel information can be derived from different sources, including from the STAs and may be in the form of CQI, CSI, or other information related to channel quality. The AP then determines the attributes to use for encoding data for the respective STAs in accordance with the channel information, including for example power allocation factor α, QAM modulation level, and station sub-symbol assignments.

In the example of FIG. 14, AP 104 receives a respective data bit stream (STA1 Data, STA2 Data, STA N Data) for each of a plurality of stations STA1, STA2 and STA N. The STA specific data bit streams STA1 Data, STA2 Data, STA N Data are processed separately and independently of each other at respective forward error correction (FEC) encoder operations 132(1), 132(2) and 132(N) and bit interleaver operations 134(1), 132(2) and 132(N). The respective interleaved, FEC coded data bit streams are then combined at a superposed constellation mapper operation 136, which outputs a single stream of constellation symbols. In an example embodiments, the superposed constellation mapper operation 136 maps the respective station data bits to corresponding constellation symbols based on constellation attributes 135 that include: (1) power allocation factor α; (2) QAM modulation level (e.g. QPSK, 16 QAM, 64 QAM, 256 QAM); and (3) station sub-symbol assignments (i.e. the sub-symbols bits assigned to each of the respective stations). By way of illustration, in one example the constellation attributes 135 could be: (1) power allocation factor α=0.3; (2) modulation level=16 QAM; and (3) total of two stations, with STA 1 assigned higher modulation LRB sub-symbol 306 ($b_1, b_3$) and STA 2 assigned lower modulation MRB sub-symbol 304 ($b_0, b_4$). In example embodiments, constellation mapping operation 136 could be performed by AP 104 based on constellation look-up tables such as 16-QAM coordinate Table 1 shown above.

Accordingly, in example embodiments, superposed constellation mapper operation 136 generates a baseband stream of superposed constellations symbol for the data field 712 of frame 700. In some examples, all or part of preamble 701 is pre-pended to the data field 701, including the STA attribute portion 740 for each of the respective STAs. In example embodiments, the resulting symbols of the baseband frame are then modulated onto multiple sub-carriers (for example modulated using orthogonal frequency division multiplexing (OFDM)) by an inverse-fast Fourier transform (IFFT) operation 138. In examples where spatial mapping is used to direct messages transmitted form the AP is specific directions, spatial mapping operation 140 is applied. The resulting baseband steam can then be up-converted to a respective carrier frequency and transmitted by AP 104.

Figure 15:
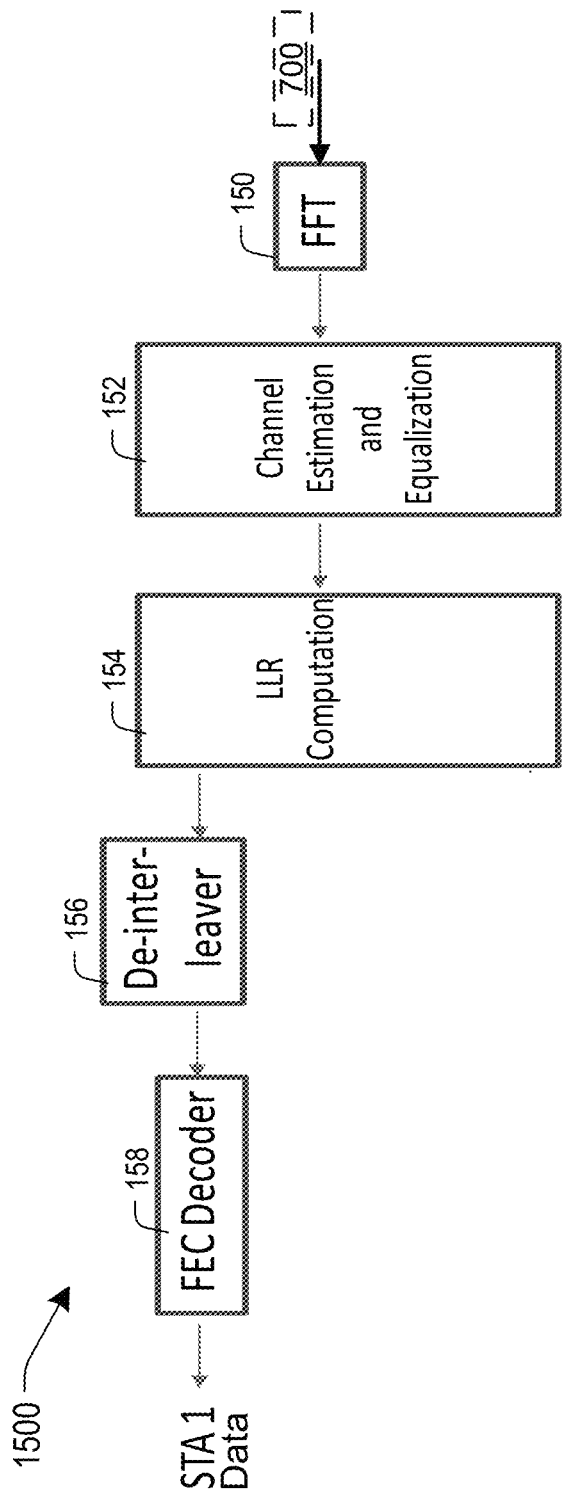
FIG. 15 shows operations performed out at stations according to an example embodiment.

FIG. 15 shows, according to an example embodiment, baseband operations 1500 that are performed at respective STAs to recover STA specific data from a received frame 700. FIG. 15 specifically shows operations performed at STA1 to recover the data bit stream ST1 Data, however similar operations are carried out at other stations that have data in the frame 700. As shown in FIG. 15, STA1 performs a fast Fourier transform (FFT) operation 150 on the symbols of down-converted baseband frame 700 to covert the frame symbols into time domain. The resulting frame symbols are then subjected to channel estimation and equalization operations 152, which are carried out based on the information contained in at least some of the fields of the preamble 701 (including for example STF field 708 and LTF field 708).

An LLR computation operation 154 is then performed. The symbols that LLR computation operation 154 receives as inputs are values that represent relative coordinate points in the superposed constellation, and LLR computation operation 154 uses log likelihood ratios to convert these values to actual bits. In order to do this, LLR computation operation 154 uses the information included in the STA attribute portion 740 of frame 700 for the receiving STA (eg. (1) power allocation factor α; (2) QAM modulation level; and (3) station sub-symbol assignment. As indicated above, STA attribute portion 740 will typically be modulated using a very low level modulation such as BPSK, enabling the STA to extract the information required for LLR computation operation 154. In an illustrative example where: (1) power allocation factor α=0.3; (2) modulation level=16 QAM; and (3) STA 1 is higher modulation LRB sub-symbol 306 ($b_1, b_3$), LLR computation operation 154 will decode both the LRB and MRB sub-symbols into respective bits, but will ignore the bits of MRB sub-symbol 304 ($b_0, b_2$).

Accordingly, although data for all the STAs was included in the symbols input to LLR computation operation 154, only the bits that correspond to STA 1 data are output by LLR computation operation 154. The resulting bit stream is rearranged to put the bits into their original order by de-interleaver operation 156 and then subjected to FEC decoder operation 158, resulting in recovered STA1 Data.

Figure 16:
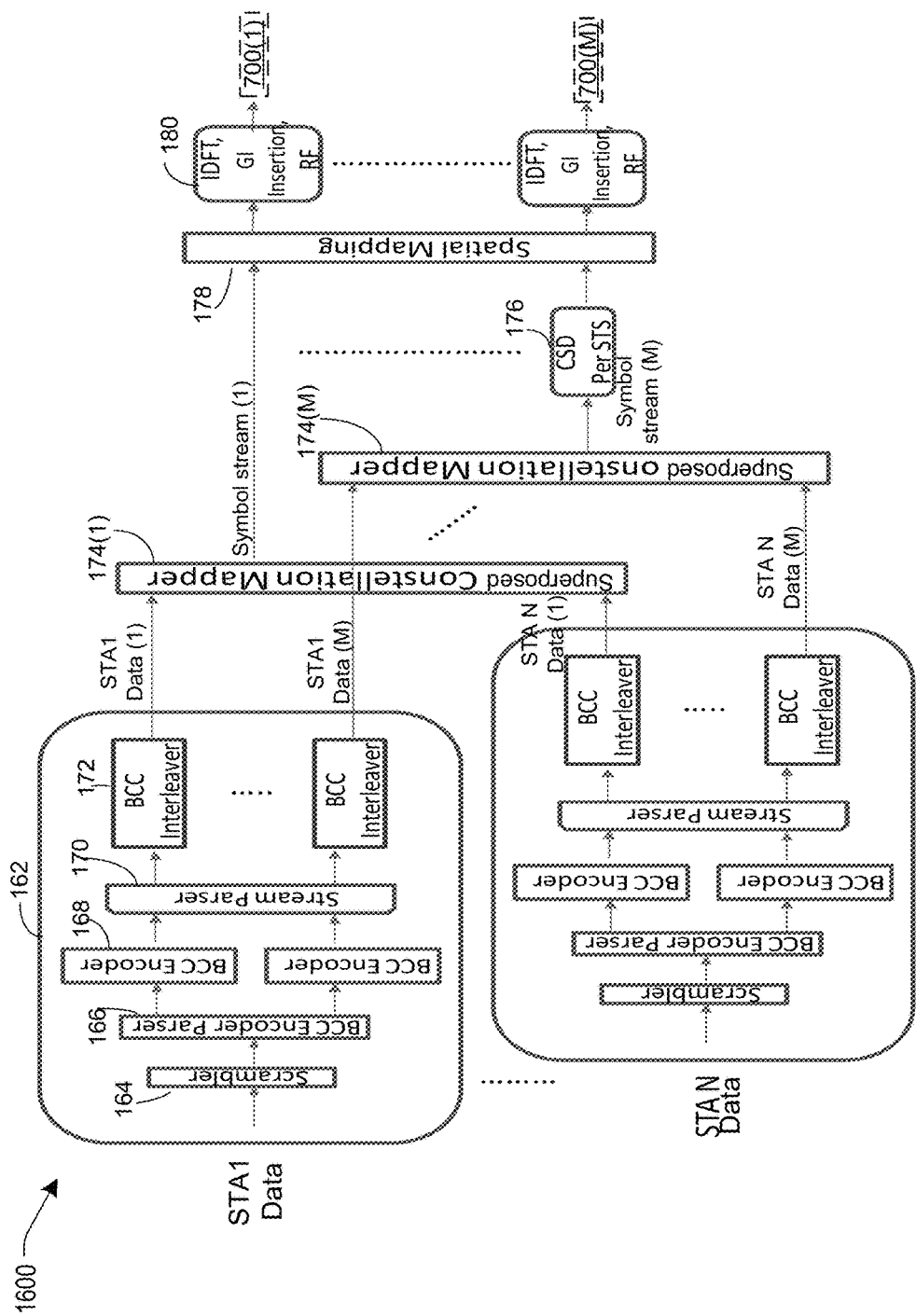
FIG. 16 shows operations performed out at an access point according to another example embodiment.

The examples of FIG. 14 and FIG. 15 illustrate a SISO environment. FIG. 16 shows an example of baseband operations 1600 carried out by AP 104 in a multiple input multiple output (MIMO) environment in which M spatial streams are transmitted by AP 104. In the example of FIG. 16, AP 104 receives a respective data bit stream (STA1 Data to STA N Data) for each of a plurality (N) of stations STA1 to STA N. Each of the data bit streams STA1 Data to STA N Data is divided into multiple streams of data through a series of encoding and interleaving operations 162 that are performed separately for each data bit stream. By way of example, in FIG. 16, the data for STA 1, namely data bit stream STA1 Data, undergoes encoding and interleaving operations 162 in which the data bits are scrambled by a scrambling operation 164, and then parsed into two or more streams at a first parser operation 166. Each of the parsed streams are then provided to respective binary convolutional code (BCC) encoder operations 168. The BCC encoded streams are then provided to a stream parser operation 170 at which the BCC encoded streams are further parsed to provide a total of M data streams, which are then each individually are subjected to an BCC interleaver operation 172. As indicated in FIG. 16 as a result of encoding and interleaving operations 162 the data bit stream STA1 Data is divided into M parallel data streams STA1 Data(1) to STA1 Data(M). Similar operations are carried out for the other STAs, resulting in N sets of M data streams. The respective data streams from each of the STAs are processed as a group by respective superposed constellation mapper operations 174(1) to 174(M). As an illustrative example, as shown in FIG. 16, the data streams STA1 Data (1) and STA N Data (N) are processed together by superposed constellation mapper operation 174(1) to generate a corresponding single stream of constellation symbols (Symbol stream (1)) that each incorporate data for the stations STA1 to STA N. Similarly, the data streams STA1 Data (M) and STA N Data (M) are processed together by superposed constellation mapper operation 174(M) to generate a corresponding single stream of constellation symbols (symbol stream (M)) that also each incorporate data for the stations STA1 to STA N. The superposed constellation mapper operation 174(1) to 174(N) that is performed on each group of station specific data streams is generally identical to the superposed constellation mapper operation 136 discussed above in respect of the SISO environment.

A stream specific preamble (for example, preamble 701) can be prepended to each symbol stream (1) to (M) to form frames 700(1) to 700(M) that each include the respective constellation attribute information 135 for the stream. Each symbol stream (1) to (M) can then be processed in a manner consistent with known MIMO transmitter operations. For example, each stream can be subjected to a respective cyclic shift delay (CSD) operation, followed by a spatial mapping operation 178 and then an OFDM modulation operation 180. The resulting M baseband steams are up-converted to their allotted spatial stream frequency and transmitted by AP 104.

In other embodiments different operations may be performed. For example in example embodiments, low density party check (LDPC) protocols could be applied, in which case the encoding and interleaving operations 162 could be replaced by parsing the output of an LDPC encoder into M streams.

At a receiving station (for example STA 1), each of the M streams can be separated using known MIMO detection techniques, and then each individual stream can be processed in a similar manner as discussed above in respect of FIG. 15, with the exception that in some examples the separated data bit streams can be recombined prior to FEC decoding and the FEC decoder operation 158 done on the combined stream.

Figure 17A:
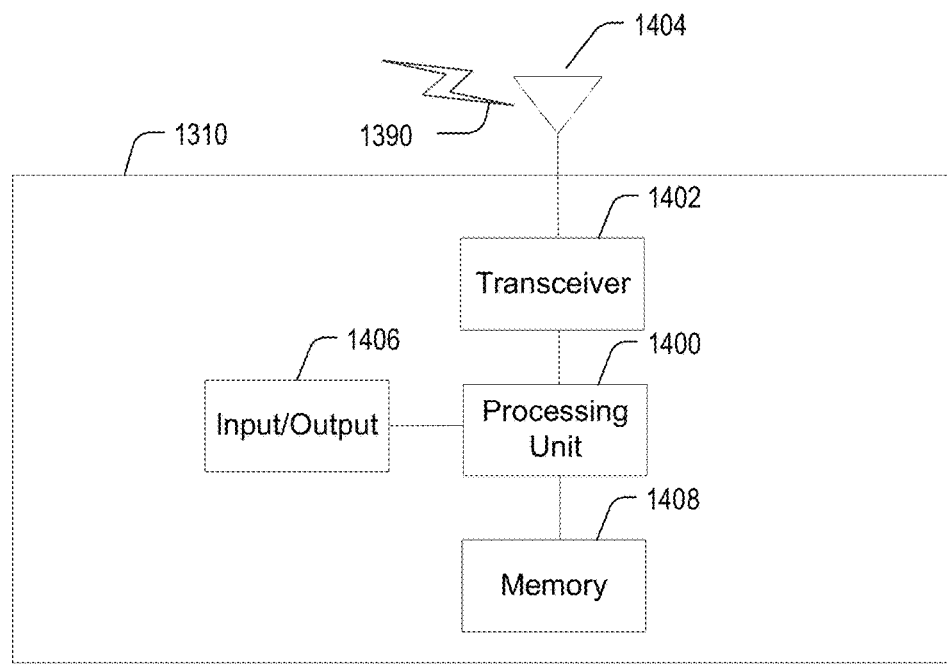
FIG. 17A illustrates an example of a station that can be used in the network of FIG. 1
Figure 17B:
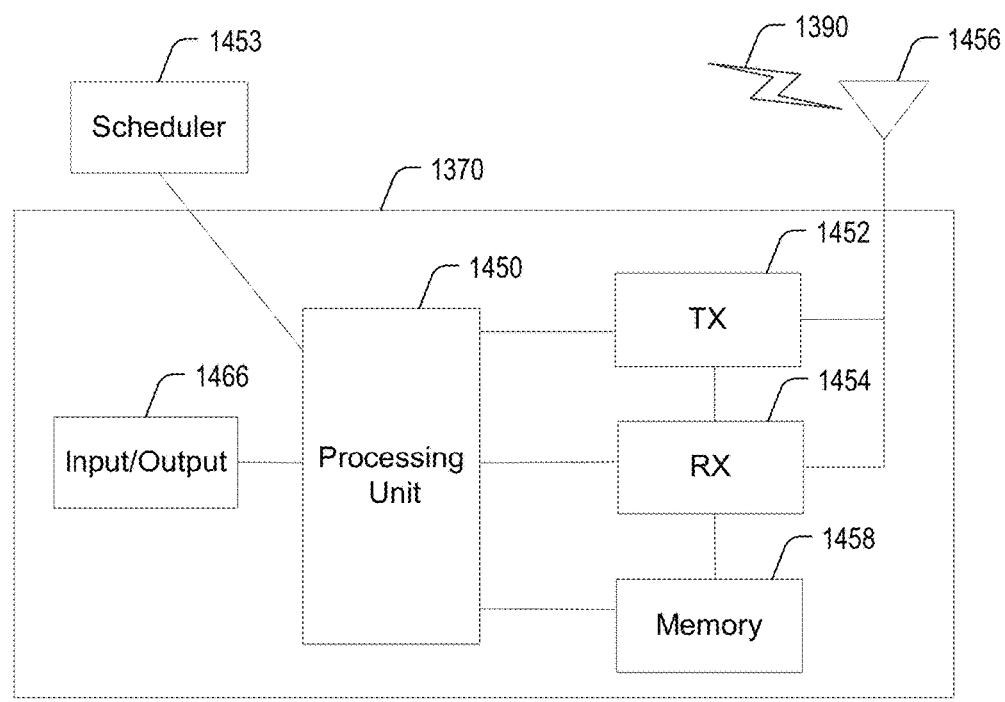
FIG. 17B illustrates an example of an access point that can be used in the network of FIG. 1.

FIGS. 17A and 17B illustrate example devices that may implement the methods and teachings according to this disclosure. In particular, FIG. 17A illustrates an example STA 1310, and FIG. 17B illustrates an example AP 1370.

As shown in FIG. 17A, the STA 1310 includes at least one processing unit 1400. The processing unit 1400 implements various processing operations of the STA 1310. For example, the processing unit 1400 could perform signal coding, data processing, power control, input/output processing, or any other functionality enabling the STA 1310 to operate in the communication system 1300. The processing unit 1400 may also be configured to implement some or all of the functionality and/or embodiments described in more detail above. Each processing unit 1400 includes any suitable processing or computing device configured to perform one or more operations. Each processing unit 1400 could, for example, include a microprocessor, microcontroller, digital signal processor, field programmable gate array, or application specific integrated circuit.

The STA 1310 also includes at least one transceiver 1402. The transceiver 1402 is configured to modulate data or other content for transmission by at least one antenna or Network Interface Controller (NIC) 1404. The transceiver 1402 is also configured to demodulate data or other content received by the at least one antenna 1404. Each transceiver 1402 includes any suitable structure for generating signals for wireless or wired transmission and/or processing signals received wirelessly or by wire. Each antenna 1404 includes any suitable structure for transmitting and/or receiving wireless or wired signals. One or multiple transceivers 1402 could be used in the STA 1310, and one or multiple antennas 1404 could be used in the STA 1310. Although shown as a single functional unit, a transceiver 1402 could also be implemented using at least one transmitter and at least one separate receiver.

The STA 1310 further includes one or more input/output devices 1406 or interfaces (such as a wired interface to the internet 1350). The input/output devices 1406 permit interaction with a user or other devices in the network. Each input/output device 1406 includes any suitable structure for providing information to or receiving information from a user, such as a speaker, microphone, keypad, keyboard, display, or touch screen, including network interface communications.

In addition, the STA 1310 includes at least one memory 1408. The memory 1408 stores instructions and data used, generated, or collected by the STA 1310. For example, the memory 1408 could store software instructions or modules configured to implement some or all of the functionality and/or embodiments described above and that are executed by the processing unit(s) 1400. Each memory 1408 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 17B, the AP 1370 includes at least one processing unit 1450, at least one transmitter 1452, at least one receiver 1454, one or more antennas 1456, at least one memory 1458, and one or more input/output devices or interfaces 1466. A transceiver, not shown, may be used instead of the transmitter 1452 and receiver 1454. A scheduler 1453 may be coupled to the processing unit 1450. The scheduler 1453 may be included within or operated separately from the AP 1370. The processing unit 1450 implements various processing operations of the AP 1370, such as signal coding, data processing, power control, input/output processing, or any other functionality. The processing unit 1450 can also be configured to implement some or all of the functionality and/or embodiments described in more detail above. Each processing unit 1450 includes any suitable processing or computing device configured to perform one or more operations. Each processing unit 1450 could, for example, include a microprocessor, microcontroller, digital signal processor, field programmable gate array, or application specific integrated circuit.

Each transmitter 1452 includes any suitable structure for generating signals for wireless or wired transmission to one or more STAs or other devices. Each receiver 1454 includes any suitable structure for processing signals received wirelessly or by wire from one or more STAs or other devices. Although shown as separate components, at least one transmitter 1452 and at least one receiver 1454 could be combined into a transceiver. Each antenna 1456 includes any suitable structure for transmitting and/or receiving wireless or wired signals. Although a common antenna 1456 is shown here as being coupled to both the transmitter 1452 and the receiver 1454, one or more antennas 1456 could be coupled to the transmitter(s) 1452, and one or more separate antennas 1456 could be coupled to the receiver(s) 1454. Each memory 1458 includes any suitable volatile and/or non-volatile storage and retrieval device(s) such as those described above in connection to the STA 1310. The memory 1458 stores instructions and data used, generated, or collected by the AP 1370. For example, the memory 1458 could store software instructions or modules configured to implement some or all of the functionality and/or embodiments described above and that are executed by the processing unit(s) 1450.

Each input/output device 1466 permits interaction with a user or other devices in the network. Each input/output device 1466 includes any suitable structure for providing information to or receiving/providing information from a user, including network interface communications.

Various modifications to the embodiments described herein may be readily apparent to those skilled in the art, and the generic principles of the methods and devices described herein may be applied to other embodiments. Thus, the present disclosure is not intended to be limited to the embodiments shown herein but is to be accorded the widest scope consistent with the principles and novel features disclosed herein. Certain adaptations and modifications of the described embodiments can be made. Therefore, the above discussed embodiments are considered to be illustrative and not restrictive.

What is claimed is:

1. A method performed at a network node, comprising:
determining a power allocation factor from a plurality of possible power allocation factors;
allocating, based on the power allocation factor, energy between first and second constituent constellations that are superposed to form a quadrature amplitude modulation (QAM) constellation;
mapping first data and second data to a symbol of the QAM constellation, wherein the first data is mapped to a first sub-symbol of the symbol that corresponds to the first constituent constellation and the second data is mapped to a second sub-symbol of the symbol that corresponds to the second constituent constellation; and
transmitting the constellation symbol in a frame as an radio frequency (RF) signal,
wherein increasing the power allocation factor increases energy allocated to the first constituent constellation by an amount that is proportional to a decrease in energy allocated to the second constituent constellation.

2. The method of claim 1 wherein the QAM constellation includes a sub-constellation of symbols in each of four quadrants, wherein increasing the power allocation factor increases distances between symbols within each sub-constellation and decreases distances between the sub-constellations.

3. The method of claim 1 where the power allocation factor represents an average power of each symbol in the QAM constellation.

4. The method of claim 1 wherein the QAM constellation is a 16 QAM constellation representing 16 possible 4-bit symbols ($b_0b_1b_2b_3$), each 4-bit symbol ($b_0b_1b_2b_3$) representing bits and having relative in-phase (I) and quadrature (Q) axis coordinates as follows:

| SYMBOL ($b_0b_1b_2b_3$) | COORDINATES I + jQ |
|---|---|
| 0000 | $(-K_f - K_n) + j(-K_f - K_n)$ |
| 0001 | $(-K_f - K_n) + j(-K_f + K_n)$ |
| 0010 | $(-K_f - K_n) + j(K_f + K_n)$ |
| 0011 | $(-K_f - K_n) + j(K_f - K_n)$ |
| 0100 | $(-K_f + K_n) + j(-K_f - K_n)$ |
| 0101 | $(-K_f + K_n) + j(-K_f + K_n)$ |
| 0110 | $(-K_f + K_n) + j(K_f + K_n)$ |
| 0111 | $(-K_f + K_n) + j(K_f - K_n)$ |
| 1000 | $(K_f + K_n) + j(-K_f - K_n)$ |
| 1001 | $(K_f + K_n) + j(-K_f + K_n)$ |
| 1010 | $(K_f + K_n) + j(K_f + K_n)$ |
| 1011 | $(K_f + K_n) + j(K_f - K_n)$ |
| 1100 | $(K_f - K_n) + j(-K_f - K_n)$ |
| 1101 | $(K_f - K_n) + j(-K_f + K_n)$ |
| 1110 | $(K_f - K_n) + j(K_f + K_n)$ |
| 1111 | $(K_f - K_n) + j(K_f - K_n)$ | wherein:
$\alpha$ is the power allocation factor, $0<\alpha<1$, $$K_f = \frac{\sqrt{1-\alpha}}{\sqrt{2}}, \text{ and } K_n = \frac{\sqrt{\alpha}}{\sqrt{2}}.$$

5. The method of claim 4 wherein the first sub-symbol comprises bits $b_0$ and $b_2$ of the symbol $b_0b_1b_2b_3$ and the second sub-symbol comprises bits $b_1$ and $b_3$ of the symbol $b_0b_1b_2b_3$.

6. The method of claim 4 wherein one of the plurality of possible power allocation factors is $\alpha=0.2$.

7. The method of claim 1 wherein the QAM constellation is a 64 QAM constellation representing 64 possible 6-bit symbols ($b_0b_1b_2b_3b_4b_5$), each of the 6-bit symbols ($b_0b_1b_2b_3b_4b_5$) having a relative in-phase (I) axis coordinate selected from the set $(-K_f-X_3, -K_f-X_1, -K_f+X_1, -K_f+X_3, K_f-X_3, K_f-X_1, K_f+X_1, K_f+X_3)$ and a relative quadrature (Q) axis coordinate selected from the set $(-K_f-X_3, -K_f-X_1, -K_f+X_1, -K_f+X_3, K_f-X_3, K_f-X_1, K_f+X_1, K_f+X_3)$
wherein:
$\alpha$ is the power allocation factor, $0<\alpha<1$, $$K_f = \frac{\sqrt{1-\alpha}}{\sqrt{2}}$$

$$K_n = \frac{\sqrt{\alpha}}{\sqrt{2}},$$

$$X1 = \frac{K_n}{\sqrt{5}} \text{ and } X3 = 3\frac{K_n}{\sqrt{5}}.$$

8. The method of claim 7 wherein one of the plurality of possible power allocation factors is $\alpha=0.2381$.

9. The method of claim 7 wherein the first sub-symbol comprises bits $b_0$, $b_2$ and $b_4$ of the symbol $b_0b_1b_2b_3b_4b_5$ and the second sub-symbol comprises bits $b_1$, $b_3$ and $b_5$ of the symbol $b_0b_1b_2b_3b_4b_5$.

10. The method of claim 1 wherein the QAM constellation is a 256 QAM constellation representing 256 possible 6-bit symbols ($b_0b_1b_2b_3b_4b_5b_6b_7$), each of the symbols in a first quadrant of the 256 QAM constellation having a relative in-phase (I) axis coordinate selected from the set
$(K_f-X_7, K_f-X_5, K_f-X_3, K_f-X_1, K_f+X_1, K_f+X_3, K_f+X_5, K_f+X_7)$ and a relative quadrature (Q) axis coordinate selected from the set
$(K_f-X_7, K_f-X_5, K_f-X_3, K_f-X_1, K_f+X_1, K_f+X_3, K_f+X_5, K_f+X_7)$,
$\alpha$ is the power allocation factor, $0<\alpha<1$, $$K_f = \frac{\sqrt{1-\alpha}}{\sqrt{2}},$$

$$K_n = \frac{\sqrt{\alpha}}{\sqrt{2}},$$

$$X1 = \frac{K_n}{\sqrt{21}}, X3 = 3\frac{K_n}{\sqrt{21}}, X5 = 5\frac{K_n}{\sqrt{21}}, \text{ and } X7 = 7\frac{K_n}{\sqrt{21}}.$$

11. The method of claim 10 wherein one of the plurality of possible power allocation factors is $\alpha=0.247$.

12. The method of claim 1 wherein the frame includes a multi-bit field, the method including populating the multi-bit field with an index value that represents the power allocation factor.

13. A network node comprising:
a memory;
an interface for wireless communication; and
a processing device configured to execute instructions stored in the memory to cause the network node to:

determine a power allocation factor from a plurality of possible power allocation factors;

allocate, based on the power allocation factor, energy between first and second constituent constellations that are superposed to form a quadrature amplitude modulation (QAM) constellation;

map first data and second data to a symbol of the QAM constellation, wherein the first data is mapped to a first sub-symbol of the symbol that corresponds to the first constituent constellation and the second data is mapped to a second sub-symbol of the symbol that corresponds to the second constituent constellation; and transmit the constellation symbol in a frame as an radio frequency (RF) signal using the interface, wherein increasing the power allocation factor increases energy allocated to the first constituent constellation by an amount that is proportional to a decrease in energy allocated to the second constituent constellation.

14. The network node of claim 13 wherein the QAM constellation includes a sub-constellation of symbols in each of four quadrants, wherein increasing the power allocation factor increases distances between symbols within each sub-constellation and decreases distances between the sub-constellations.

15. The network node of claim 13 wherein the QAM constellation is a 16 QAM constellation representing 16 possible 4-bit symbols ($b_0b_1b_2b_3$), each 4-bit symbol ($b_0b_1b_2b_3$) representing bits and having relative in-phase (I) and quadrature (Q) axis coordinates as follows:

| SYMBOL ($b_0b_1b_2b_3$) | COORDINATES I + jQ |
|---|---|
| 0000 | $(-K_f - K_n) + j(-K_f - K_n)$ |
| 0001 | $(-K_f - K_n) + j(-K_f + K_n)$ |
| 0010 | $(-K_f - K_n) + j(K_f + K_n)$ |
| 0011 | $(-K_f - K_n) + j(K_f - K_n)$ |
| 0100 | $(-K_f + K_n) + j(-K_f - K_n)$ |
| 0101 | $(-K_f + K_n) + j(-K_f + K_n)$ |
| 0110 | $(-K_f + K_n) + j(K_f + K_n)$ |
| 0111 | $(-K_f + K_n) + j(K_f - K_n)$ |
| 1000 | $(K_f + K_n) + j(-K_f - K_n)$ |
| 1001 | $(K_f + K_n) + j(-K_f + K_n)$ |
| 1010 | $(K_f + K_n) + j(K_f + K_n)$ |
| 1011 | $(K_f + K_n) + j(K_f - K_n)$ |
| 1100 | $(K_f - K_n) + j(-K_f - K_n)$ |
| 1101 | $(K_f - K_n) + j(-K_f + K_n)$ |
| 1110 | $(K_f - K_n) + j(K_f + K_n)$ |
| 1111 | $(K_f - K_n) + j(K_f - K_n)$ | wherein:

α is the power allocation factor, 0<α<1, $$K_f = \frac{\sqrt{1-\alpha}}{\sqrt{2}}, \text{ and}$$

$$K_n = \frac{\sqrt{\alpha}}{\sqrt{2}}.$$

16. The network node of claim 15 wherein the first sub-symbol comprises bits $b_0$ and $b_2$ of the symbol $b_0b_1b_2b_3$ and the second sub-symbol comprises bits $b_1$ and $b_3$ of the symbol $b_0b_1b_2b_3$.

17. The network node of claim 15 wherein one of the plurality of possible power allocation factors is α=0.2.

18. The network node of claim 13 wherein the QAM constellation is a 64 QAM constellation representing 64 possible 6-bit symbols ($b_0b_1b_2b_3b_4b_5$), each of the 6-bit symbols ($b_0b_1b_2b_3b_4b_5$) having a relative in-phase (I) axis coordinate selected from the set ($-K_f-X_3$, $-K_f-X_1$, $-K_f+X_1$, $-K_f+X_3$, $K_f-X_3$, $K_f-X_1$, $K_f+X_1$, $K_f+X_3$) and a relative quadrature (Q) axis coordinate selected from the set ($-K_f-X_3$, $-K_f-X_1$, $-K_f+X_1$, $-K_f+X_3$, $K_f-X_3$, $K_f-X_1$, $K_f+X_1$, $K_f+X_3$)

wherein:

α is the power allocation factor, 0<α<1, $$K_f = \frac{\sqrt{1-\alpha}}{\sqrt{2}},$$

$$K_n = \frac{\sqrt{\alpha}}{\sqrt{2}},$$

$$X1 = \frac{K_n}{\sqrt{5}} \text{ and } X3 = 3\frac{K_n}{\sqrt{5}}.$$

19. The network node of claim 18 wherein one of the plurality of possible power allocation factors is α=0.2381.

20. The network node of claim 13 wherein the QAM constellation is a 256 QAM constellation representing 256 possible 6-bit symbols ($b_0b_1b_2b_3b_4b_5b_6b_7$), each of the symbols in a first quadrant of the 256 QAM constellation having a relative in-phase (I) axis coordinate selected from the set ($K_f-X_7$, $K_f-X_5$, $K_f-X_3$, $K_f-X_1$, $K_f+X_1$, $K_f+X_3$, $K_f+X_5$, $K_f+X_7$) and a relative quadrature (Q) axis coordinate selected from the set ($K_f-X_7$, $K_f-X_5$, $K_f-X_3$, $K_f-X_1$, $K_f+X_1$, $K_f+X_3$, $K_f+X_5$, $K_f+X_7$), α is the power allocation factor, 0<α<1, $$K_f = \frac{\sqrt{1-\alpha}}{\sqrt{2}},$$

$$K_n = \frac{\sqrt{\alpha}}{\sqrt{2}},$$

$$X1 = \frac{K_n}{\sqrt{21}}, X3 = 3\frac{K_n}{\sqrt{21}}, X5 = 5\frac{K_n}{\sqrt{21}}, \text{ and } X7 = 7\frac{K_n}{\sqrt{21}}.$$

21. The network node of claim 20 wherein one of the plurality of possible power allocation factors is α=0.247.

22. A method performed at a network node, comprising:

mapping first data for a first station to a first bit of a quadrature phase shift keying (QPSK) symbol and second data for a second station to a second bit of the QPSK symbol; and transmitting the QPSK symbol in a frame as an radio frequency (RF) signal for the first station and the second station, wherein the mapping includes allocating energy between the first bit and second bit based on a power allocation factor.

* * * * *